United States Patent
Zanovitch et al.

(10) Patent No.: US 7,183,906 B2
(45) Date of Patent: Feb. 27, 2007

(54) THREAT SCANNING MACHINE MANAGEMENT SYSTEM

(75) Inventors: Joseph Zanovitch, Barton, NY (US); Susan Douglas, Candor, NY (US); Michael Heaton, Owego, NY (US); Tonya Bender, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 181 days.

(21) Appl. No.: 10/804,088

(22) Filed: Mar. 19, 2004

(65) Prior Publication Data

US 2005/0206514 A1    Sep. 22, 2005

(51) Int. Cl.
*G08B 29/00* (2006.01)
(52) U.S. Cl. .................. 340/518; 340/541; 340/521; 340/5.12; 340/5.3; 340/5.32
(58) Field of Classification Search ............... 340/541, 340/518, 521, 5.12, 5.3, 5.32, 5.7
See application file for complete search history.

(56) References Cited

U.S. PATENT DOCUMENTS

| | | |
|---|---|---|
| 3,678,278 A | 7/1972 | Peil |
| 3,695,462 A | 10/1972 | Sullivan |
| 3,776,395 A | 12/1973 | Lilngg et al. |
| 4,137,567 A | 1/1979 | Grube |
| 4,210,811 A | 7/1980 | Dennhoven et al. |
| 4,416,435 A | 11/1983 | Szendrodi et al. |
| 4,604,704 A | 8/1986 | Eaves et al. |
| 4,634,849 A | 1/1987 | Klingen |
| 4,879,735 A | 11/1989 | Owens |
| 5,153,439 A | 10/1992 | Gozani et al. |
| 5,182,764 A | 1/1993 | Peschmann et al. |

(Continued)

FOREIGN PATENT DOCUMENTS

CA    2443469    10/2002

(Continued)

OTHER PUBLICATIONS

Tony Lee Orrd, "Is That A Gun Or Just A Security Test?" Government Computer News/GCN.com, Jun. 5, 2000, vol. 19, No. 14, p. 1-3.

(Continued)

*Primary Examiner*—Daryl C Pope
(74) *Attorney, Agent, or Firm*—Miles & Stockbridge PC; James T. Carmichael

(57) ABSTRACT

Disclosed is a dynamically configurable threat scanning machine management system that utilizes a network to connect threat scanning machines with a central control computer. The central control computer can transmit, among other things, operational software and threat profiles to the threat scanning machines, while the threat scanning machines can transmit, among other things, images and performance data to the central computer. The threat scanning machine management system can be arranged in a hierarchical manner, which enables threat scanning machines at various locations to be connected into regional, national or international control centers for greater management efficiency. The network may be wireless and the control computer may be portable, enabling a supervisor to remotely manage the threat scanning machines while remaining mobile about the facility, or elsewhere. Additionally, the threat scanning machine management system can be accessed and monitored remotely from a web browser via secure Internet access.

14 Claims, 38 Drawing Sheets

U.S. PATENT DOCUMENTS

| | | |
|---|---|---|
| 5,363,951 A | 11/1994 | Mensch |
| 5,367,552 A | 11/1994 | Perschmann |
| 5,373,538 A | 12/1994 | Grenier et al. |
| 5,479,023 A | 12/1995 | Bartle |
| 5,490,218 A | 2/1996 | Krug et al. |
| 5,600,303 A | 2/1997 | Husseiny et al. |
| 5,600,700 A | 2/1997 | Krug et al. |
| 5,642,393 A | 6/1997 | Krug et al. |
| 5,692,029 A | 11/1997 | Husseiny et al. |
| 5,793,639 A | 8/1998 | Yamazaki |
| 5,796,802 A | 8/1998 | Gordon |
| 5,802,289 A | 9/1998 | Oprescu |
| 5,838,758 A | 11/1998 | Krug et al. |
| 5,870,449 A | 2/1999 | Lee et al. |
| 5,910,973 A | 6/1999 | Grodzins |
| 5,949,842 A | 9/1999 | Schafer et al. |
| 5,970,113 A | 10/1999 | Crawford et al. |
| 5,974,111 A | 10/1999 | Krug et al. |
| 5,991,764 A | 11/1999 | Sundaresan |
| 6,014,628 A | 1/2000 | Kovarik, Jr. |
| 6,018,562 A | 1/2000 | Willson |
| 6,044,353 A | 3/2000 | Pugliese, III |
| 6,088,423 A | 7/2000 | Krug et al. |
| 6,145,653 A | 11/2000 | Mensch |
| 6,158,658 A | 12/2000 | Barclay |
| 6,218,943 B1 | 4/2001 | Ellenbogen |
| 6,222,452 B1 | 4/2001 | Ahlstrom et al. |
| 6,230,043 B1 | 5/2001 | Johnson |
| 6,256,404 B1 | 7/2001 | Gordon et al. |
| 6,283,260 B1 | 9/2001 | Yasuda, Sr. |
| 6,335,688 B1 | 1/2002 | Sweatte |
| 6,335,960 B2 | 1/2002 | Knigge et al. |
| 6,345,113 B1 | 2/2002 | Crawford et al. |
| 6,359,886 B1 | 3/2002 | Ujihara et al. |
| 6,364,365 B1 | 4/2002 | Caplan |
| 6,370,222 B1 | 4/2002 | Cornick, Jr. |
| 6,460,681 B1 | 10/2002 | Coutant et al. |
| 6,471,039 B1 | 10/2002 | Bruun et al. |
| 6,472,984 B1 | 10/2002 | Risi |
| 6,507,278 B1 | 1/2003 | Brunetti et al. |
| 6,512,964 B1 | 1/2003 | Quackenbush et al. |
| 6,546,072 B1 | 4/2003 | Chalmers |
| 6,580,778 B2 | 6/2003 | Meder |
| 6,594,547 B2 | 7/2003 | Manabe et al. |
| 6,637,563 B1 | 10/2003 | Ruckh |
| 6,650,729 B2 | 11/2003 | Braess et al. |
| 6,668,990 B2 | 12/2003 | Humiston, Jr. |
| 6,707,879 B2 | 3/2004 | McClelland et al. |
| 6,721,391 B2 | 4/2004 | McClelland et al. |
| 6,791,487 B1 | 9/2004 | Singh et al. |
| 6,922,460 B2 | 7/2005 | Skatter et al. |
| 6,946,300 B2 | 9/2005 | Nguyen et al. |
| 6,952,163 B2 * | 10/2005 | Huey et al. ................. 340/521 |
| 6,970,088 B2 | 11/2005 | Kovach |
| 6,982,960 B2 | 1/2006 | Lee et al. |
| 7,027,773 B1 | 4/2006 | McMillin |
| 2001/0015380 A1 | 8/2001 | Good et al. |
| 2002/0040928 A1 | 4/2002 | Jalili et al. |
| 2002/0069293 A1 | 6/2002 | Natalio |
| 2002/0107714 A1 | 8/2002 | Whitlock et al. |
| 2002/0134836 A1 | 9/2002 | Cash et al. |
| 2002/0172324 A1 | 11/2002 | Ellengogen |
| 2002/0176532 A1 | 11/2002 | McClelland et al. |
| 2002/0185358 A1 | 12/2002 | Zeitler et al. |
| 2002/0186862 A1 | 12/2002 | McClelland et al. |
| 2002/0191739 A1 | 12/2002 | Allen et al. |
| 2002/0198731 A1 | 12/2002 | Barnes et al. |
| 2003/0023592 A1 | 1/2003 | Modica et al. |
| 2003/0085163 A1 | 5/2003 | Chan et al. |
| 2003/0085281 A1 | 5/2003 | Knowles et al. |
| 2003/0100973 A1 | 5/2003 | Quackenbush et al. |
| 2003/0115340 A1 | 6/2003 | Sagula et al. |
| 2003/0118151 A1 | 6/2003 | Menhardt |
| 2003/0127511 A1 | 7/2003 | Kelley et al. |
| 2003/0128100 A1 | 7/2003 | Burkhardt et al. |
| 2003/0128806 A1 | 7/2003 | Morrell |
| 2003/0137415 A1 | 7/2003 | Thomson |
| 2003/0141411 A1 | 7/2003 | Pandya et al. |
| 2003/0147484 A1 | 8/2003 | Olshansky et al. |
| 2003/0152186 A1 | 8/2003 | Jurczyk et al. |
| 2003/0156679 A1 | 8/2003 | Mori et al. |
| 2003/0185340 A1 | 10/2003 | Frantz |
| 2003/0189094 A1 | 10/2003 | Trabitz |
| 2003/0214583 A1 | 11/2003 | Sadok |
| 2004/0001568 A1 | 1/2004 | Impson et al. |
| 2004/0010697 A1 | 1/2004 | White |
| 2004/0017887 A1 | 1/2004 | Le et al. |
| 2004/0021572 A1 | 2/2004 | Schoen et al. |
| 2004/0036623 A1 | 2/2004 | Chung |
| 2004/0054550 A1 | 3/2004 | Cole et al. |
| 2004/0148571 A1 | 7/2004 | Lue |
| 2005/0028091 A1 | 2/2005 | Bordawekar et al. |
| 2005/0031076 A1 | 2/2005 | McClelland et al. |
| 2005/0036470 A1 | 2/2005 | Calvert |
| 2005/0110672 A1 | 5/2005 | Cardiasmenos et al. |
| 2005/0190061 A1 | 9/2005 | Trela |
| 2005/0206514 A1 | 9/2005 | Zanovitch et al. |
| 2005/0237180 A9 | 10/2005 | Boesch et al. |
| 2005/0251397 A1 | 10/2005 | Zanovitch et al. |
| 2005/0248450 A1 | 11/2005 | Zanovitch |
| 2005/0251398 A1 | 11/2005 | Zanovitch et al. |

FOREIGN PATENT DOCUMENTS

| | | |
|---|---|---|
| CN | 1428718 | 7/2003 |
| DE | 4210516 | 10/1993 |
| EP | 0 459 648 A1 | 12/1991 |
| JP | 6075978 | 3/1994 |
| JP | 2002 292372 A | 10/2000 |
| JP | 2003122879 A | 4/2003 |
| WO | WO 90/12660 | 11/1990 |
| WO | WO 02/082290 A2 | 10/2002 |
| WO | WO 03/029844 A2 | 4/2003 |

OTHER PUBLICATIONS

Robert J. Edley, "Hold Baggage Screening Systems" Airport International, pp. 1-6.
L-3 Communications Security & Detection Systems, L-3 Communications Secures Poland's First HBS Systems Award—Total Contract Valued at Approx. $1 Million, Airport International, pp. 1-2.
Bill Mawer, "Security Net—The Shape of Things to Come" Airport International, pp. 1-7.
Rapiscan, "Rapiscan Advanced Technologies" pp. 1-2.
Rapiscan 515, "X-Ray Screening System", pp. 1-2.
Rapiscan 519, "Advanced Portable X-Ray System", pp. 1-2.
Rapiscan 520B, "X-Ray Screening System", pp. 1-2.
Rapiscan 522B, pp. 1-2.
Rapiscan 524, "X-Ray Screening System", pp. 1-2.
Rapiscan 526, "X-Ray Screening System", pp. 1-2.
Rapiscan 527, "X-Ray Screening System", pp. 1-2.
Rapiscan 532H, pp. 1-2.
Affidavit of Joseph P. Zanovitch.
HI-SCAN 6040i/7555i "X-ray Inspection Systems".
Information Technology for Counterterrorism, Box 3.7, "Scenarios for Automated Evidence Combination" 4 pgs.
U.S. Appl. No. 10/971,021, filed Oct. 25, 2004, Bender et al.

* cited by examiner

FIG. 22

Validian

| Remote Management | Threat Management | Maintenance Server | TIP Management | Log Off | Help |

STATUS

Download Schedule

Communications

- No Response to Ping
(TSA-023 07:23 AM)

| Download | File | Date | Time | Locations |
|---|---|---|---|---|
| Dnld-001 | All | 05/20/2003 | 12:00pm | TSM-003 |
| Dnld-002 | Profile 2 | 05/21/2003 | 01:00pm | TSM-001, TSM-005, ... |
| Dnld-003 | Profile 4 | 05/23/2003 | 03:00am | CC-003, CC-001, ... |
| Dnld-004 | Profile 2 | 05/25/2003 | 05:00am | TSM-002 |
| Dnld-005 | Profile 3 | 05/26/2003 | 06:00am | All |

[Schedule New Download]

FIG. 25

System Administration

STATUS

Communications

- No Response to Ping
(TSA-023 07:23 AM)

Parent:

| Hostname | Type | IP Address | Status | Connection | Local Time |
|---|---|---|---|---|---|
| NER.CC-001 | CC | 24.28.114.9 | Online | LAN | 05/01/2003 12:03pm |

Children:

| Hostname | Type | IP Address | Status | Connection | Local Time |
|---|---|---|---|---|---|
| NER.JFK.HH-001 | HH | 24.26.165.15 | Online | LAN | 05/01/2003 12:03pm |
| NER.JFK.T6.CP2.CC-001 | CC | 24.26.165.15 | Online | LAN | 05/01/2003 09:04pm |
| NER.JFK.T6.CP2.TSM-002 | TSM | 24.26.165.15 | Online | Dialup | 05/01/2003 09:04pm |
| NER.JFK.T6.CP2.TSM-003 | TSM | 24.26.165.15 | Offline | Dialup | 05/01/2003 09:04pm |
| NER.JFK.T6.CP2.TSM-004 | TSM | 24.26.165.15 | Rebooting | LAN | 05/01/2003 09:04pm |
| NER.JFK.T6.CP2.TSM-005 | TSM | 24.26.165.15 | Repair | LAN | 05/01/2003 09:04pm |
| NER.JFK.T6.CP2.TSM-006 | TSM | 24.26.165.15 | Online | LAN | 05/01/2003 09:04pm |
| NER.JFK.T6.CP2.TSM-007 | TSM | 24.26.165.15 | Online | LAN | 05/01/2003 09:04pm |
| NER.JFK.T6.CP2.TSM-008 | TSM | 24.26.165.15 | Online | LAN | 05/01/2003 12:03pm |

[Unselect All]

[Synchronize All Times] [Reboot Selected Host(s)]

[Add New Host] [View Selected Host] [Modify Selected Host]
[Delete Selected Host(s)]

© 2003 Lockheed Martin Corporation

FIG. 26

Validian
STATUS

Communications

- No Response to Ping
(TSA-023 07:23 AM)

| Remote Management | Threat Management | Maintenance Server | TIP Management | Log Off | Help |

Personnel Report

| Report Filter | |
|---|---|
| Location: | All |
| Operator: | All |

| Location | Operator | Screener #1 | Screener #2 | Screener #3 |
|---|---|---|---|---|
| TSM-001 | jzanovitch | jmichael | echin | N/A |
| TSM-002 | mgaug | edavid | blu | N/A |
| TSM-003 | scurry | jcarter | dbailey | jnicholson |
| TSM-004 | jporter | poakenfield | rstone | bstrathmore |

© 2003 Lockheed Martin Corporation

Validian STATUS

Historical Bag/Threat Information
General Overview Report

Communications

- No Response to Ping
(TSA-023 07:23 AM)

Report Filter

| Time Period: | One month |
|---|---|
| Machine ID: | All |
| Operator: | All |

| Bag ID | Machine ID | Date/Time | Threat Type | Supervisor Resolution |
|---|---|---|---|---|
| B000101 | NER.JFK.T6.CP2.TSM-002 | 05/26/2003 05:43pm | Weapon | Threat successfully cleared. |
| B000102 | NER.JFK.T6.CP2.TSM-004 | 05/29/2003 05:43pm | Explosive | Threat successfully cleared. |
| B012433 | NER.JFK.T6.CP2.TSM-001 | 05/30/2003 05:43pm | Weapon | Threat successfully cleared. |
| B064321 | NER.JFK.T6.CP2.TSM-006 | 06/14/2003 05:43pm | Explosive | Threat successfully cleared. |

[Back]

© 2003 Lockheed Martin Corporation

FIG. 30

Threat Type Information
General Overview Report

Report Filter

| Threat Category: | All |

| Threat ID | Threat Category | Threat First Detected |
|---|---|---|
| D873SDGP02 | Explosive | Bag ID: RJ90S3D |
| T1038472 | Weapon | Bag ID: B029387 |
| T1238374 | Weapon | Bag ID: B282038 |
| T3904842 | Weapon | Bag ID: B212822 |

[Back]

© 2003 Lockheed Martin Corporation

Validian STATUS

Communications

- No Response to Ping
(TSA-023 07:23 AM)

FIG. 31

Validian

STATUS

Remote Management | Threat Management | Maintenance Server | TIP Management | Log Off | Help

All Actions Taken Information
General Overview Report

Communications

- No Response to Ping
(TSA-023 07:23 AM)

| Report Filter | |
|---|---|
| Time Period: | Month |
| Machine ID: | All |
| Operator: | All |

| Location | Operator | Date/Time | Action |
|---|---|---|---|
| TSM-002 | E103189 | 05/02/2003 08:03pm | Cleared Threat 1 of 3 |
| TSM-001 | E135468 | 05/04/2003 08:03pm | Cleared Threat 1 of 1 |
| TSM-004 | E198465 | 05/05/2003 08:03pm | Cleared Threat 1 of 2 |
| TSM-021 | E130111 | 05/08/2003 08:03pm | Cleared Threat 3 of 3 |

Back

THREAT SCANNING MACHINE MANAGEMENT SYSTEM

The present invention relates generally to system management, and, more particularly, to the management of threat scanning machines.

Threat scanning machines are often employed in locations where safety and security are at issue. Transportation facilities, for example, airports, train stations, seaports, and the like, may employ threat scanning machines to detect security threats within passenger or freight baggage. Other facilities, such as office buildings, government buildings, court houses, museums and the like may employ threat scanning machines to detect restricted items being carried by a person seeking entry to the facility. A threat scanning machine, as used herein, refers to any device capable of detecting an object defined as a threat. A threat, as used herein, can be anything that is restricted from being brought aboard a vehicle, into a building or into an area.

Threat scanning machines may be of different make and model, including carry-on bag scanning machines, checked-bag scanning machines, walk-through metal detectors, x-rays, computerized tomography devices, magnetic resonance imaging devices, and the like, thus requiring individualized maintenance and control of each machine's software and data components. The task of individually maintaining and controlling each machine may be time consuming, prone to error and expensive. For example, when supervisor attention is required at a particular machine, the supervisor must physically go to the machine, assess the situation and provide guidance to the threat scanning machine operator. As another example, when the software in an existing threat scanning machine needs to be upgraded, the media containing the upgrade may be required to be carried from machine to machine in order to perform the upgrade. The diversity of threat scanning machine types and the varied locations of threat scanning machines pose obstacles to the efficient management of the threat scanning machines.

In an exemplary embodiment of the threat scanning machine management system, the threat scanning machines are connected to a communication network. One or more control center computers are connected to the communication network. The threat scanning machines, possibly of different make and model, are adapted with hardware and software to allow them to communicate over the network with the control center computer. The control center computer is adapted with software and/or hardware to control and manage threat scanning machines. In another exemplary embodiment of the present invention, the control computer can transmit data, such as, for example, operational software and threat profiles to the threat scanning machine; and the threat scanning machines may transmit data, such as, for example, images and performance data to the control computer.

In yet another exemplary embodiment of the present invention, a supervisor may view the images or performance data of a threat scanning machine remotely on the control center computer, assess the situation and assist the threat scanning machine operator remotely, thereby permitting the supervisor to manage multiple threat scanning machines in an efficient manner. In still another exemplary embodiment of the present invention, the threat scanning machine management system may be dynamically configurable, the network may be a wireless network, and the control center computer may be a portable device, thus permitting a superior to manage the threat scanning machines while remaining mobile.

BRIEF DESCRIPTION OF THE DRAWINGS

FIG. 22 is an illustration of an exemplary embodiment of the threat scanning machine management system user interface showing a Fault Reporting selection dialog;

FIG. 25 is an illustration of an exemplary embodiment of the threat scanning machine management system user interface showing a download schedule;

FIG. 26 is an illustration of an exemplary embodiment of the threat scanning machine management system user interface showing the System Administration screen;

FIG. 28 is an illustration of an exemplary embodiment of the threat scanning machine management system user interface showing a Personnel Report;

FIG. 29 is an illustration of an exemplary embodiment of the threat scanning machine management system user interface showing a Current Alarm Report;

FIG. 30 is an illustration of an exemplary embodiment of the threat scanning machine management system user interface showing an Historical Bag/Threat Information Report;

FIG. 31 is an illustration of an exemplary embodiment of the threat scanning machine management system user interface showing a Threat Type Information Report;

FIG. 32 is an illustration of an exemplary embodiment of the threat scanning machine management system user interface showing an All Actions Taken Information Report;

FIG. 35 is an illustration of an exemplary embodiment of the threat scanning machine management system user interface showing a Download Management Report;

FIG. 36 is an illustration of an exemplary embodiment of the threat scanning machine management system user interface showing a TIP Image Management Report;

DETAILED DESCRIPTION

While the exemplary embodiments illustrated herein may show the various components of the threat scanning machine, and corresponding command and control center, collocated, it is to be appreciated that the various components of the system can be located at distant portions of a distributed network, such as a telecommunications network and/or the Internet or within a dedicated communications network. Thus, it should be appreciated that the components of the threat scanning machine and the command and control center, respectively, can be combined into one or more devices or collocated on a particular note of a distributed network, such as a telecommunications network. As will be appreciated from the following description, and for reasons of computational efficiency, the components of the communications network can be arranged at any location within the distributed network without affecting the operation of the system. Also, the exemplary embodiments shown provide a layout of the system in which the subsystems (i.e. Threat Management, Remote Management, and Maintenance Server) are shown separately for conceptual clarity and for illustrative purposes in both the threat scanning machines and the command and control center. However, it should be appreciated, that other layouts, groupings, and/or arrangements of the subsystems within the system can be used.

Furthermore, it should be appreciated that the various links connecting the elements can be wired or wireless links, or a combination thereof, or any known or later developed element(s) that is capable of supplying and/or communicating data to and from the connected elements.

Figure 1:
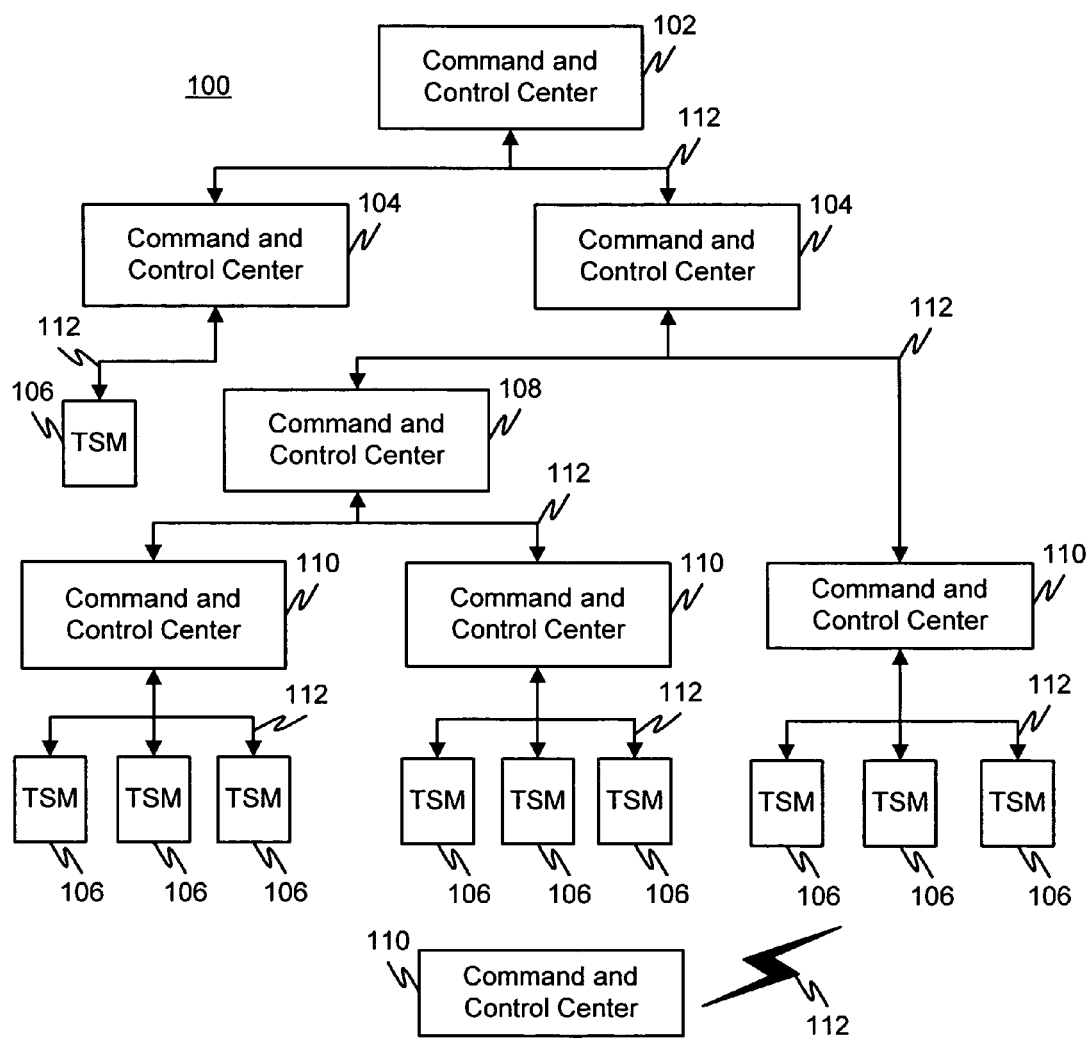
FIG. 1 is a functional block diagram of an exemplary embodiment of a threat scanning machine management system.

FIG. 1 shows a functional block diagram of an exemplary embodiment of a threat scanning machine management system 100. In particular, a command and control center 102 forms a top level of a system hierarchy and is interconnected by a network 112 to a next level comprising command and control centers 104. A command and control center 104 is interconnected with a threat scanning machine 106 by the network 112. A command and control center 104 is interconnected to command and control center 108 and to command and control center 110 via the network 112. A command and control center 110 is interconnected to one or more threat scanning machines 106 via the network 112.

The threat scanning machine management system 100 shown in FIG. 1 represents, for purposes of illustration, an exemplary configuration of command and control centers connected to each other and to threat scanning machines. However, it should be appreciated that the system 100 can be configured in order to be adaptable to various contemplated uses of the present invention. The configuration of the system 100 may be static or dynamic depending on contemplated uses of the invention. In an exemplary embodiment, a transportation facility may have an existing network (not shown), and in such a case, the threat scanning machine management system 100 may be adapted to the existing network. Alternatively, in another exemplary embodiment, if an existing network within a transportation facility is insufficient to be able to adapted to meet the communications requirements of the threat scanning machine management system 100 for any reason, such as low bandwidth or poor security, for example, then a new network can be installed for the threat scanning machine management system 100 to communicate over. However, it should be appreciated that any communications medium that allows the threat scanning machines and the control centers to communicate may be used with equal success. In an exemplary embodiment of the invention, the command and control centers and the threat scanning machines communicate over the network 112 using standard protocols common in the industry. Examples of standard protocols include, for example, HTTP, IIOP, RMI, SMTP, SSL, SHTTP and the like. Examples of a network 112 include wired or wireless solutions such as Ethernet, fiber optic, or the like. However, it should be appreciated that any present or future developed networks and/or network protocols which perform the tasks required for a command and control center to communicate with a threat scanning machine may be used with equal success according to the present invention.

In operation, the exemplary command and control center 110 communicates with one or more threat scanning machines 106 via the network 112. The command and control center 110 may transmit data to the threat scanning machine, for example, operational software, authorized users and credentials, threat profiles, etc. The operational software may comprise any combination of software for the operation of the scanning system and/or software for the operation of the management system 100. The authorized users and credentials, which may include, for example, a list of user login names and passwords. Threat profiles may include data that the threat scanning machine uses to aid in identification of threats, for example the shape of potential threat items, and/or the physical properties of an item that may indicate a potential threat. However, it should be appreciated that the data transmitted from the command and control center 110 to the threat scanning machine 106 may be any data required for the management and operation of the threat scanning machine and could be used with equal effectiveness according to the present invention.

The exemplary threat scanning machine 106 communicates with the command and control center 110. The threat scanning machine my receive data from the command an control center 110 and/or may transmit data to the command and control center 110. The data that the threat scanning machine may transmit to the command and control center 110 may include, for example, performance data, requests for operator assistance, threat detection data, and/or the like.

The exemplary command and control center 110 may communicate with one or more command and control centers 104 and/or 102. In the exemplary embodiment shown in FIG. 1, the command and control centers 110 are interconnected to command and control centers 104. The command and control centers 104 are interconnected to command and control center 102. In this exemplary embodiment and configuration of the present invention control centers are arranged in a hierarchical manner to provide for the centralized management of many threat scanning machines 106 from a central command and control center 102, thus providing more efficient management of the threat scanning machines 106.

Figure 2:
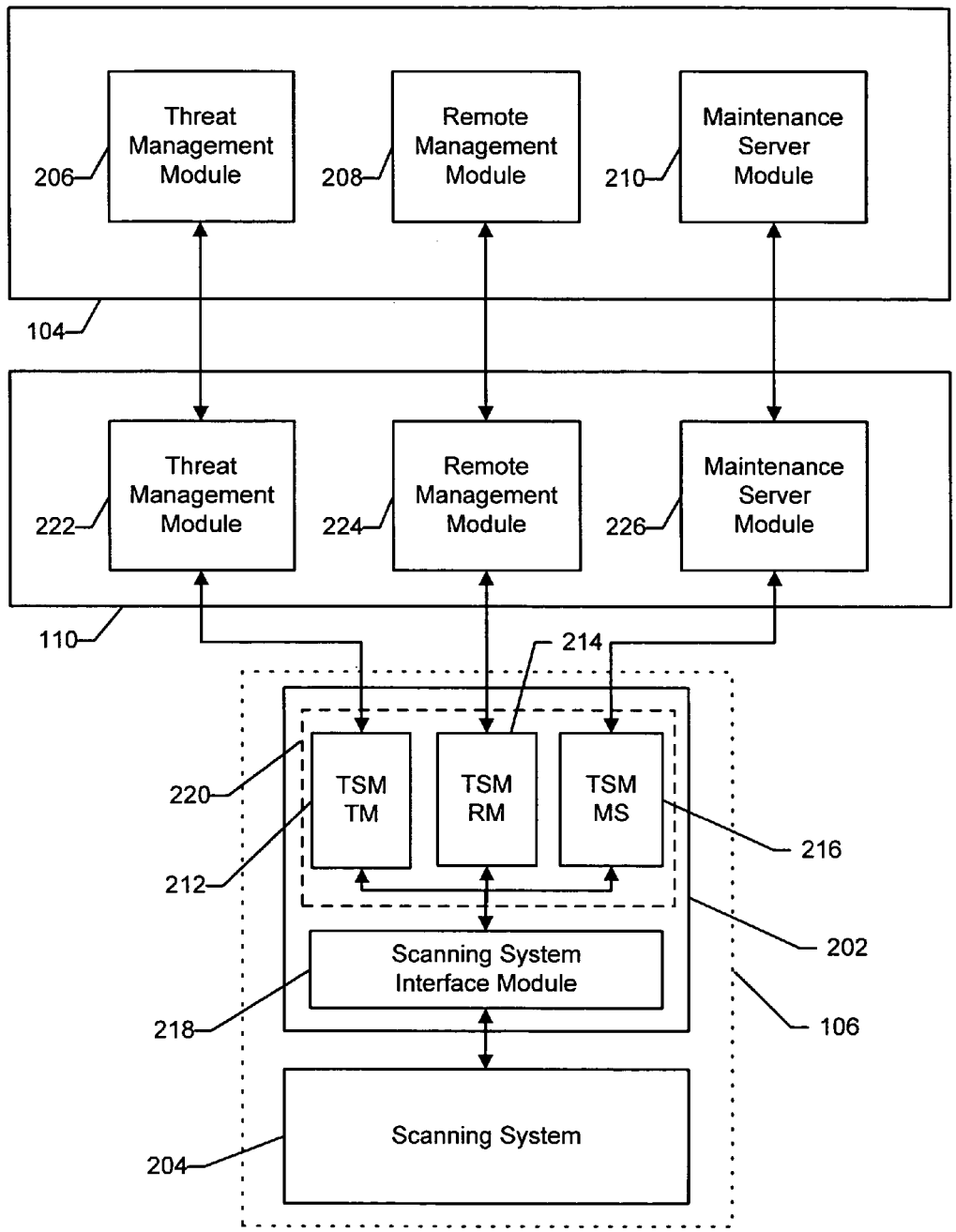
FIG. 2 is a functional block diagram of an exemplary embodiment of a threat scanning machine management system showing the control centers connected to a threat scanning machine in accordance with the present invention.

FIG. 2 is a functional block diagram of an exemplary embodiment of a threat scanning machine management system. In particular, a command and control center 104 at one level is interconnected with a command and control center 110 of another level. The command and control center 104 comprises, in addition to standard control center components, a threat management module 206, a remote management module 208 and a maintenance server module 210. The exemplary command and control center 110 comprises, in addition to standard control center components, a threat management module 222, a remote management module 224 and a maintenance server module 226. The exemplary command and control center 110 is interconnected to one or more exemplary threat scanning machines 106. The exemplary threat scanning machines 106 comprise, in addition to standard threat scanning machine components, a threat scanning machine computer 202 and a scanning system 204.

The exemplary threat scanning machine computer 202 comprises, in addition to standard computer hardware and software components, a management system interface module 220 and a scanning system interface module 218. The management system interface module 220 comprises a threat management module 212, a remote management module 214, and a maintenance server module 216. The exemplary threat management module 212, remote management module 214, and maintenance server module 216 are adapted to provide the interface and logic necessary for the threat scanning machine 106 to be connected to the maintenance and control system; these modules also communicate with the scanning system interface module 218. In an exemplary embodiment, the threat scanning machine computer 202 may be a standard PC. In another exemplary embodiment, the threat scanning machine computer 202 may be a specialized computer adapted specifically to control the threat scanning machine 106.

In yet another exemplary embodiment of the present invention, the threat scanning machine management system 100 may be designed to adapt to any existing threat scanning machine computer 202 in order to allow the threat scanning machine 106 to connect and communicate within the threat scanning machine management system.

In still another exemplary embodiment of the present invention, the system interface module 220 can be housed in a computer separate from the threat scanning machine computer 202; this construction may be useful in situations where the execution of the system interface module 220 may present too great a processing and/or communications burden for the threat scanning machine computer 202.

In operation, the exemplary threat management module 206 of the command and control center 104 communicates with the threat management module 222 of the command and control center 110. The threat management module 222 of the command and control center 110 communicates with the threat management module 212 of the threat scanning machine 106. The threat management information comprises any information related to the management of threats. Examples of such information include Threat Image Projections (TIP), which are non-threat images with threats inserted into them for testing purposes, threats detected within a particular piece of baggage, or messages alerting the threat scanning machine operators to specific or general types of security risks that may be present or that may be attempted.

The exemplary remote management module 208 of the command and control center 104 communicates with the remote management module 224 of the command and control center 110. The remote management module 224 of the command and control center 110 communicates with the remote management module 214 of the threat scanning machine 106.

The exemplary maintenance server module 210 of the command and control center 104 communicates with the maintenance server module 226 of the command and control center 110. The maintenance server module 226 of the command and control center 110 communicates with the maintenance server module 216 of the threat scanning machine 106.

The command and control center 110 and the threat scanning machine 106 may communicate with each other using a predefined interface format. A predefined format allows for the command and control center 110 to be connected to any threat scanning machine 106 that has been adapted to work in accordance with the present invention. The tables below provide an example of a predefined interface between the command and control center 110 and the threat scanning machine 106. However, it should be appreciated that these tables merely represent an exemplary interface for illustration purposes. An actual interface may vary in both content and design, while still be used with equal success, depending on contemplated uses of the invention.

TABLE 1

| Interface Message |
|---|
| Operator Bag Information |
| Screener Bag Information |
| Threat Information |
| Alarm Information |
| TIP Truth Information |
| Event Information |
| User Keystroke Information |
| TIP Configuration |
| Threat Detection Configuration |

Table 1 shows the messages of an exemplary interface between the command and control center 110 and the threat scanning machine 106. In this exemplary interface the threat scanning machine 106 transmits messages to the command and control center 110, including, for example, Operator Bag Information, Screener Bag Information, Threat Information, Alarm Information, Threat Image Projection (TIP) Truth Information, Event Information, and/or User Keystroke Information. While the command and control enter 110 transmits the TIP Configuration and Threat Detection Configuration messages to the threat scanning machine 106.

TABLE 2

| Operator Bag Information | |
|---|---|
| Field Name | Description |
| Machine ID | Unique Identifier of Threat Scanning Machine |
| Bag ID | Identification of the bag |
| TIP ID | Identification of the TIP image |
| Logon ID | Operator ID |
| Bag Start Date CT | Date bag entered CT |
| Bag Start Time CT | Time bag entered CT |
| Bag Start Date QR | Date bag entered QR |
| Bag Start Time QR | Time bag entered QR |
| Operator Start Date CT | Date operator received the image |
| Operator Start Time CT | Time operator received the image |
| Operator End Date CT | Date operator completed the transaction |
| Operator End Time CT | Time operator completed the transaction |
| Bag Size | Length and/or weight of bag |
| Number of Threats | Number of threats detected in this bag |
| Number of Keystrokes | Number of keystrokes used by operator |
| Machine Decision | Machine indication of possible threat present within bag |
| Operator Decision | Operator indication of possible threat present within bag |
| Image ID | File name if cannot be derived from Bag ID |

Table 2 shows the contents of an exemplary Operator Bag Information message. The Operator Bag Information message provides the command and control center 110 with information relating to a particular piece of baggage that has been scanned by the threat scanning machine 106.

In operation, the Operator Bag Information message is used to transmit information gathered by an operator on a particular bag. A supervisor or screener can review the Operator Bag Information message in assisting the operator in assessing a potential threat. Another use of the Operator Bag Information message may be to monitor the performance of an operator by placing a test bag containing a known threat or threat-like object in order to evaluate the operator's performance in identifying and assessing the potential threat. A further use of the Operator Bag Information message is to collect the messages over time in order to form statistical models of the operator bag information. These statistical models may then be used to further enhance the operation of the threat scanning machine management system.

TABLE 3

| Screener Bag Information | |
|---|---|
| Field Name | Description |
| Machine ID | Unique Identifier of Threat Scanning Machine |
| Bag ID | Identification of the bag |
| Logon ID | Screener ID |
| Screener Start Date CT | Date screener received the image |
| Screener Start Time CT | Time screener received the image |
| Screener End Date CT | Date screener completed the transaction |
| Screener End Time CT | Time screener completed the transaction |
| Number of Keystrokes | Number of keystrokes used by screener |
| Screener Decision | Determination of possible threat within bag |
| Screener Annotation | Screener's notes |

Table 3 shows the contents of an exemplary Screener Bag Information message. The Screener Bag Information message provides the command and control center 110 with information from a particular screener about a particular piece of baggage.

In operation, when a threat scanning machine and/or operator detect a potential threat, a screener may be called upon to search the bag physically. The Screener Bag Information message is used to transmit information gathered by a Screener on a particular bag, such as the results of the physical search, threats found or not found, and any action taken by security with regard to the passenger or the baggage. A supervisor can review the Screener Bag Information in assisting the screener and operator in assessing and dealing with a potential threat. Another use of the Screener Bag Information message may be to monitor the performance of a screener by placing a test bag containing a known threat or threat-like object in order to evaluate the screener's performance in identifying and assessing the potential threat. A further use of the Screener Bag Information message is to collect the messages over time and correlate them with other system data, such as operator bag messages, in order to form statistical models of the screener bag information. These statistical models may then be used to further enhance the operation of the threat scanning machine management system.

An important aspect of the present invention, achieved through the operator and screener bag information messages, is that baggage may be tracked and associated with a particular person as that person moves about from place to place. For example, the information about a particular person's bag may be gathered as the person travels from location to location. The threat scanning can then be augmented with historical bag information data in order to further inform the operator, screener, or supervisor of the need for further inspection of the bag. Additionally, the baggage may be associated with an owner or carrier and vice versa, thereby permitting the threat scanning machine management system to enhance the threat scanning with auxiliary information about the owner or carrier to further enhance the security.

TABLE 4

Threat Information

| Field Name | Description |
|---|---|
| Machine ID | Unique Identifier of Threat Scanning Machine |
| Bag ID | Identification of the bag |
| CT Compound Type | Detected compound type |
| CT Mass | Measured mass/density |
| CT Confidence | Algorithm confidence factor |
| QR Compound Type | Detected compound type |
| QR Mass | Detected mass |
| Viewed by operator | Identifies if operator viewed this particular threat |
| Operator Action | Identifies what action the operator took on a given threat |
| Machine Decision | Machine decision of threat/non-threat |
| Threat Category | Identifies category of threat (e.g. weapon, explosive, etc.) |
| Picture File Name | The name of the file containing the picture |

Table 4 above shows the contents of an exemplary Threat Information message. The Threat Information message provides the command and control center 10 with information about a particular threat detected by the threat scanning machine 106.

In operation Threat Information messages may be transferred to the command and control center for assistance in assessment by a supervisor. Additionally the supervisor in the command and control center may pass the message along to a more senior supervisor at a regional or national level command and control center. Further still, the system can be configured to automatically forward messages to higher levels in the hierarchy based on preselected or dynamic criteria, such as threat type or threat category. In this manner a threat that once was only able to be viewed and assessed on site, may now be able to be assessed by numerous people with possibly increasing levels of expertise, thereby by making efficient use of the supervisor's time through a hierarchical system of review and assessment of potential threats. This process can be carried out in a very expeditious manner through the interconnection of the threat scanning machine and the command and control centers on a distributed network. A further use of the Threat Information message is for the threat management system as a whole to scan for incidents of like or similar threats and alert supervisors and threat scanning machine operators to patterns in the data which may indicate a security breach is being attempted. Still another use of the Threat Information message is to gather information on things that have been identified as threats, but in actuality are only items of interest for purposes other than security. For example, the threat scanning machine could possibly be configured to monitor for aerosol cans within baggage and record statistics related to their occurrence in the baggage. This type of statistical information on "threats" could be used to guide policies regarding acceptable items, for general research into items in baggage, or for other such purposes. In yet another use of the Threat Information messages, the data may be collected over time and used to build statistical models of potential threats and their rates of occurrence. These statistical models could be fed back into the threat management system in order to improve the accuracy, security, and management efficiency of the threat scanning machine management system.

TABLE 5

Alarm Information

| Field Name | Description |
|---|---|
| Machine ID | Unique Identifier of the Threat Scanning Machine |
| Bag ID | Identification of the bag |
| Alarm Severity | Identifies the severity of the alarm (e.g. nail clippers may be low, scissors may be medium, and gun/knife may be high) |
| Threat Category | Identifies category of threat (e.g. weapon, explosive, etc.) |
| Threat Confirmed | Annotation indicating if a threat was actually found |

Table 5 shows the contents of an exemplary Alarm Information message. The Alarm Information message provides the command and control center 110 with information about a particular alarm from the threat scanning machine 106.

In operation the Alarm Information messages provide information useful to achieving management goals. As a current situational awareness indication, the Alarm Information may be transferred both vertically (i.e. from threat scanning machine to command and control center and on up the chain of command and control centers) and horizontally (i.e. threat scanning machine to threat scanning machine) in order to inform management and other operators of threat events in a real time manner. This real time reporting of threat event information makes an added dimension in security response possible, namely one of recognizing a looming security risk that may be geographically disbursed. By utilizing threat scanning machine management systems in multiple countries it would even be possible for nations to collectively detect and recognize a global security threat event that was in the early stages of being carried out. By collecting Alarm Information messages over time, statistical trends may be analyzed to aid management in improving the efficiency and security of the threat scanning machines.

TABLE 6

Event Information

| Field Name | Description |
|---|---|
| Machine ID | Unique Identifier of the Threat Scanning Machine |
| Logon ID | User ID |
| Event Date CT | Date event happened |
| Event Time CT | Time event happened |
| Event Code | Code responding to event |
| Event Detail | Text message about event |

Table 6 shows the contents of an exemplary Event Information Message. The Event Information message provides the command and control center 110 with information about a particular event that occurred at a threat scanning machine 106.

In operation the Event Information messages provide information useful to achieving management goals. As a current situational awareness indication, the Event Information may be transferred both vertically (i.e. from threat scanning machine to command and control center and on up the chain of command and control centers) and horizontally (i.e. threat scanning machine to threat scanning machine) in order to inform management and other operators of threat events in a real time manner. This real time nature of the reporting of threat event information brings a new dimension in security response, namely one of recognizing a looming security risk that may be geographically distributed. By collecting Event Information messages over time, statistical trends may be analyzed to aid management in improving the efficiency and security of the threat scanning machines.

TABLE 7

User Keystroke Information

| Field Name | Description |
|---|---|
| Machine ID | Unique Identifier of the Threat Scanning Machine |
| Logon ID | User ID |
| Bag ID | Identification of the bag |
| Keystroke Count | Number of keystrokes |
| Keystroke 1 | Keystroke code |
| Timestamp 1 | Time keystroke occurred |
| Keystroke 2 | Keystroke code |
| Timestamp 2 | Time keystroke occurred |
| . | . |
| . | . |
| . | . |
| Keystroke n | Keystroke code |
| Timestamp n | Time keystroke occurred |

Table 7 shows the contents of an exemplary User Keystroke Information Message. The User Keystroke Information Message provides the command and control center 110 with details from the threat scanning machine 106 regarding the keystrokes of a user in the processing of a particular piece of baggage.

In operation, the User Keystroke Information message can be used for several management and supervisory purposes. The keystroke information may be used as a training aid by permitting supervisor to oversee the keystrokes used by a scanning machine operator and determine if the operator has used the scanning effectively, or if further training is needed in a particular area. Further, the keystroke information may be collected over time to study the efficiency of the threat scanning machine operators. Further still, the keystroke information may provide additional details to a supervisor who is assisting a scanning machine operator with a possible threat presence. Yet another use of the keystroke information may be to correlate the keystroke information with the image data and recreate, or playback, what took place at a particular machine to look for suspicious activity by the operator or as an aid in analyzing machine performance and debugging the threat scanning machine software.

An important aspect of the threat scanning machine management system is that is a system for managing both the threat scanning machine equipment and the personnel operating the threat scanning machines.

Figure 3:
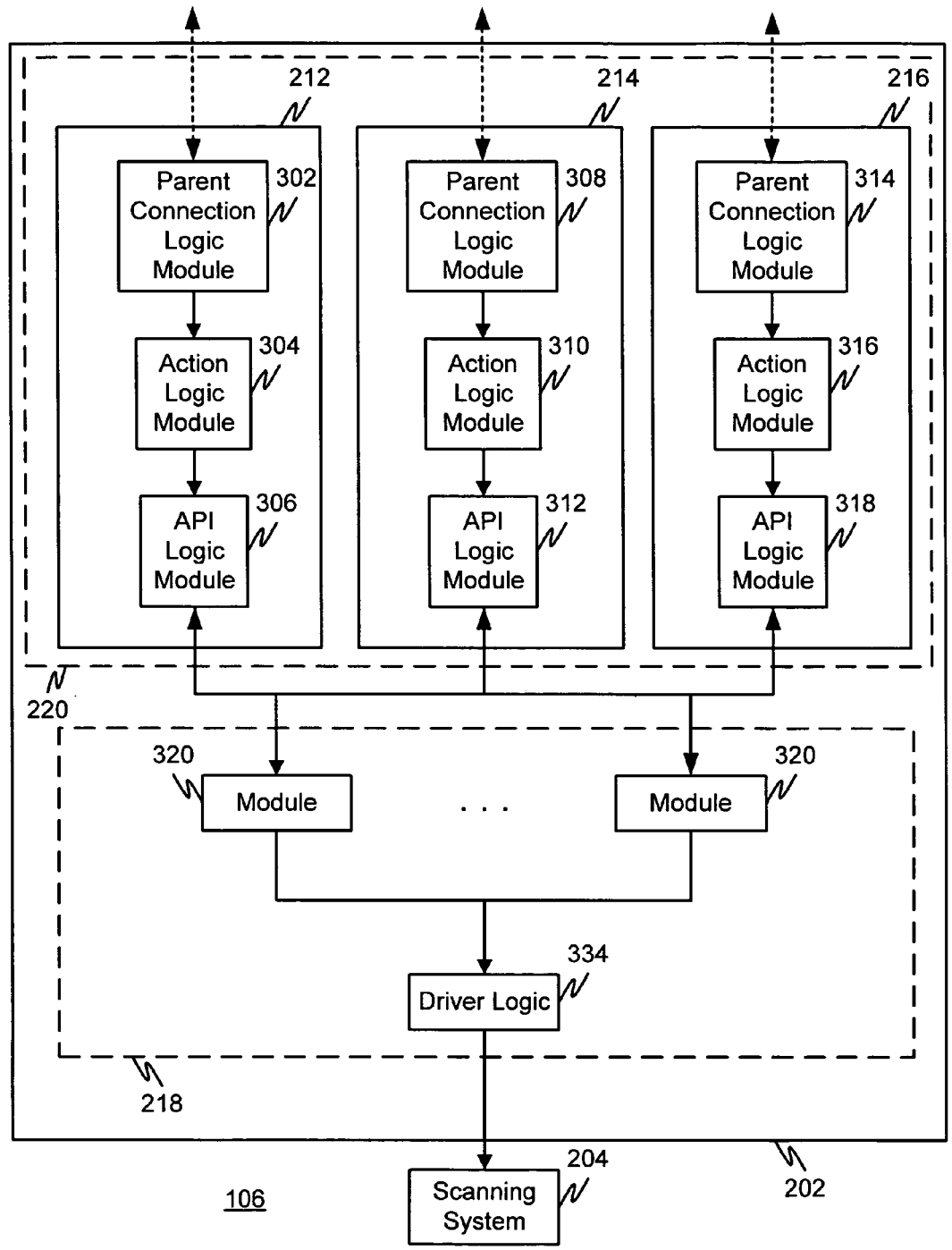
FIG. 3 is a functional block diagram of an exemplary embodiment of a threat scanning machine management system showing the details of an exemplary threat scanning machine in accordance with the present invention.

FIG. 3 is a functional block diagram of an exemplary threat scanning machine 106. In particular, the threat scanning machine 106 comprises, in addition to the standard threat scanning machine components, a computer 202 and a scanning system 204. The computer 202 comprises, in addition to standard computer components, management system interface module 220 and a scanning system interface module 218. The management system interface module 220 comprises a threat management module 212, a remote management module 214, and a maintenance server module 216. The scanning system interface module 218 comprises one or more interface modules 320, and, optionally, a low level driver module 334. The threat management module 212 comprises a parent connection logic module 302, an action logic module 304, and an Application Programming Interface (API) logic module 306. The remote management module 214 comprises a parent connection logic module 308, an action logic module 310 and an API logic module 312. The maintenance server module 216 comprises a parent connection logic module 314, an action logic module 316, and an API logic module 318.

In operation, the threat scanning machine computer 202 executes the management system interface module 220 and the threat scanning machine physical machine interface software 218.

The exemplary interface and control logic module 302 contains the logic necessary for the connection and communication with the threat management module within the control computer. The Operation Logic component 304 contains operational logic. The application programming interface (API) component 306 contains the logic necessary for interfacing with the scanning system interface module 218.

The remote management module 214 contains interface and control logic module 308 that contains the logic necessary for the connection and communication with the remote management module in a command and control center. The operational logic module 310 that contains operational logic and an application programming interface (API) component 312 that contains the logic necessary for interfacing with the scanning system interface module 218.

The interface and control logic module 314 contains the logic necessary for the connection and communication with the maintenance server module in the command and control center. Also within the threat scanning machine maintenance server module 216 is an operational logic module 316 that contains operational action logic and an application programming interface (API) component 318 that contains the logic necessary for interfacing with the scanning system interface module 218.

An exemplary embodiment of the scanning system interface module 218 is shown in FIG. 3. In particular, the scanning system interface module 218 may contain one or more modules 320. These modules 320 may provide interface logic necessary for the management system interface module 220 to be interconnected with and/or to control the scanning system 204. The modules 320 may, for example, provide user interface functionality to the threat scanning machine 106 operator. In another exemplary embodiment of the invention, the operator interface module 320 may reside within the management system interface module 220. Examples of interface modules 320 include weapons processing, explosive processing, data archiving, diagnostics, image capture, material movement system, and/or the like. In addition, the scanning system interface module 218 also may contain a low-level driver module 334 adapted to directly control the circuitry, software, and/or mechanics of the scanning system 204. It should be appreciated that the threat scanning machine 106 shown in FIG. 3 is an exemplary embodiment shown for illustration purposes, and any threat scanning machine can be utilized within the threat scanning machine management system 100 with equal success. The exact software component configuration of a particular threat scanning machine 106 will depend on its contemplated use and the capabilities of its subsystems, in accordance with the present invention.

Figure 4:
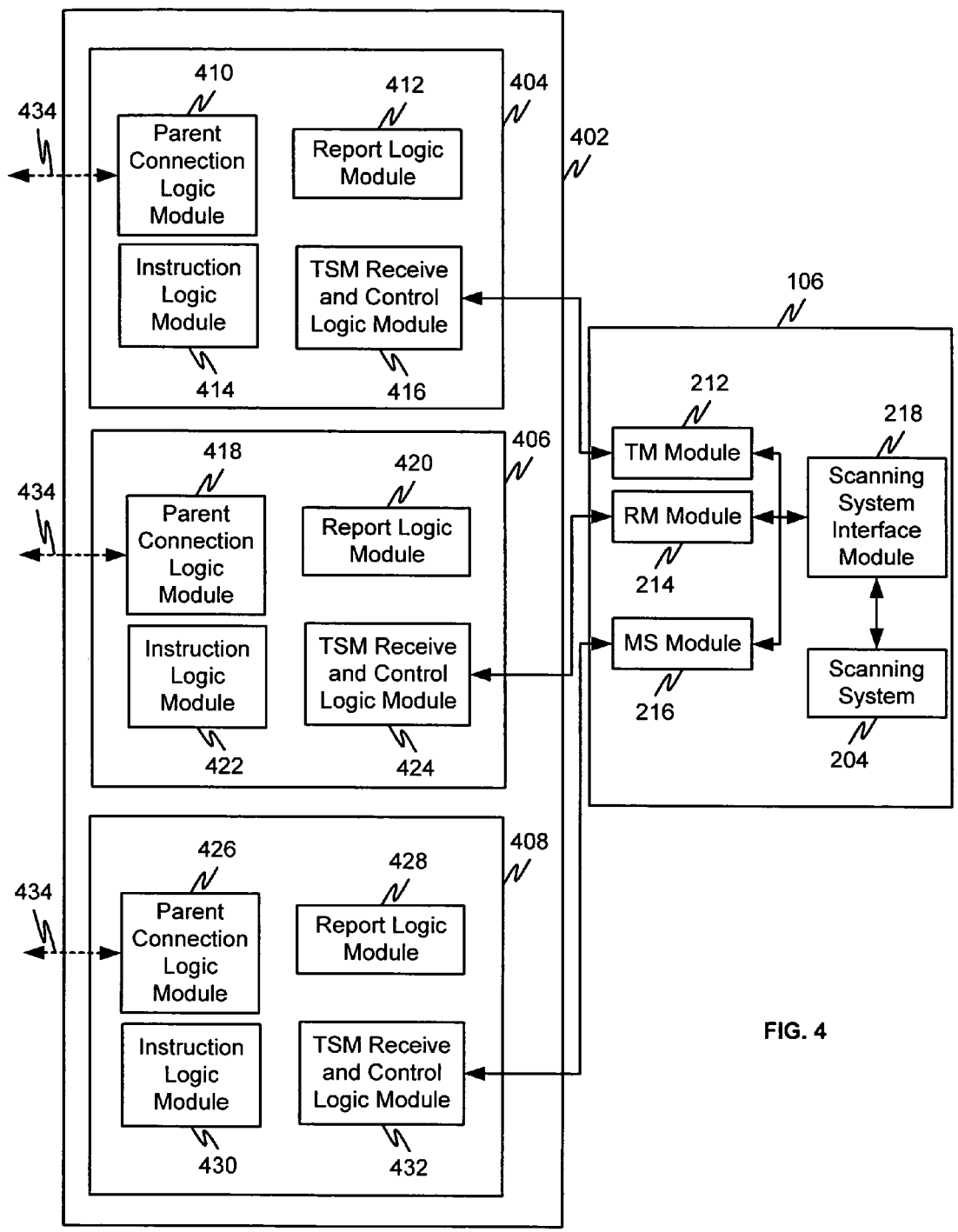
FIG. 4 is a functional block diagram of an exemplary embodiment of a threat scanning machine management system showing the details of an exemplary control center in accordance with the present invention.

FIG. 4 is a functional block diagram of an exemplary embodiment of the control center computer side of an exemplary threat scanning machine management system 100. In particular, the command and control center software 402 comprises, in addition to standard control center software components, a threat management module 404, a remote management module 406, and a maintenance server module 408.

The threat management module 404 comprises a parent connection logic module 410, a report logic module 412, an instruction logic module 414, and a threat scanning machine receive and control logic module 416.

The remote management module 406 comprises a parent connection logic module 418, a report logic module 420, an instruction logic module 422, and a threat scanning machine receive and control logic module 424.

The maintenance server module 408 comprises a parent connection logic module 426, a report logic module 428, an instruction logic module 430, and a threat scanning machine receive and control logic module 432. In an exemplary embodiment, the parent connection logic modules (302, 308, and 314) of the threat scanning machine 106 may be similar to the parent connection logic modules (410, 418, and 426) of the command and control center 110.

Figure 5:
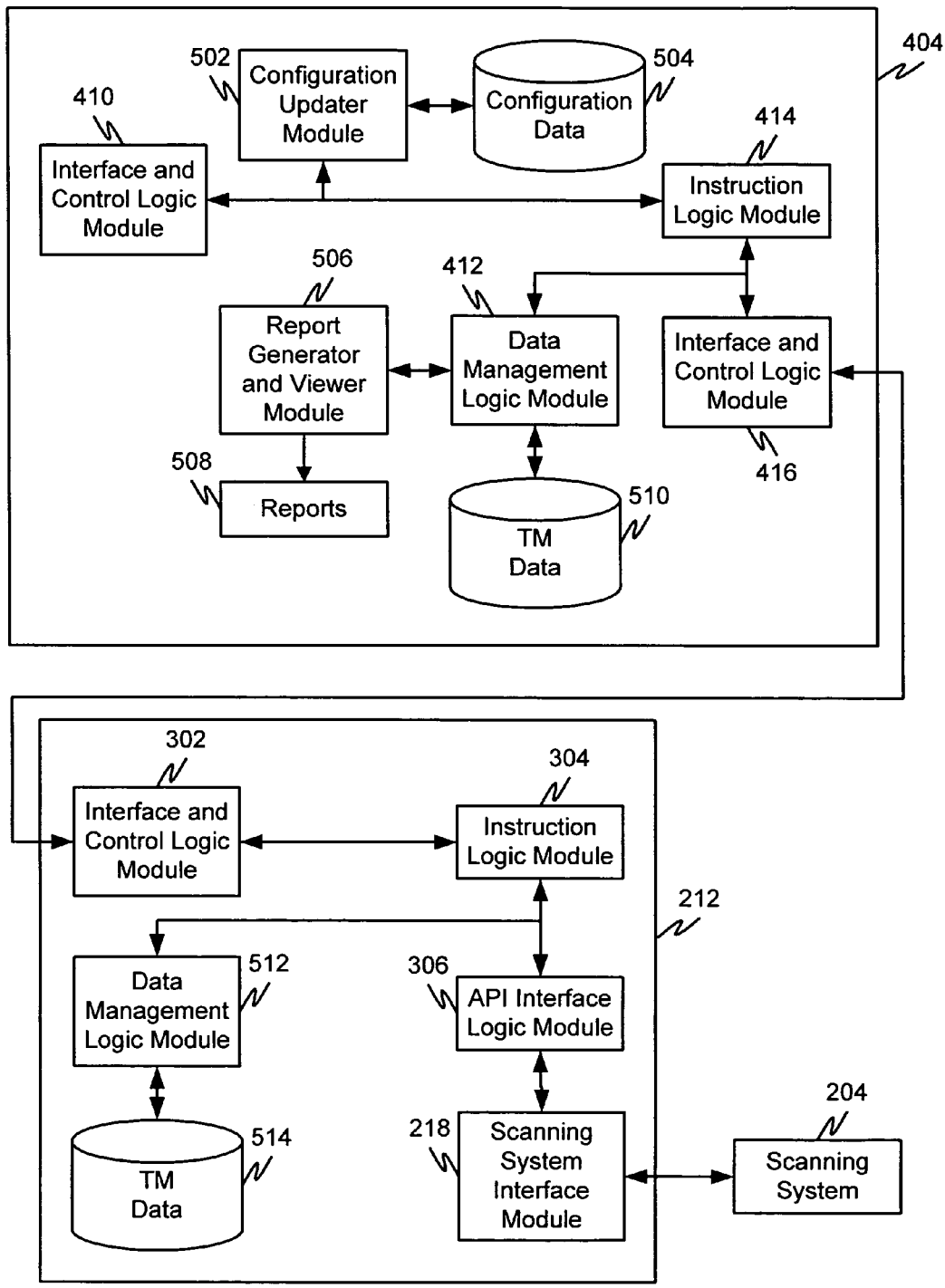
FIG. 5 is a functional block diagram of an exemplary embodiment of the logical functions of an exemplary threat management module in accordance with the present invention.

FIG. 5 is a functional block diagram of an exemplary embodiment of a threat management module in accordance with the present invention. In particular, a command and control center threat management module 404 is shown connected to a threat scanning machine threat management module 212. The command and control center threat management module 404 comprises an interface and control logic module 410, a configuration updater 502, a configuration database 504, a report generator and viewer module 506, one or more reports 508, an instruction logic module 414, a data management logic module 412, threat management database 510 and interface and control logic module 416. The threat scanning machine threat management module 212 comprises an interface and control logic module 302, an instruction logic module 304, a data management logic module 512, a threat management database 514, an API interface logic module 306, and a scanning system interface module 218.

Figure 6:
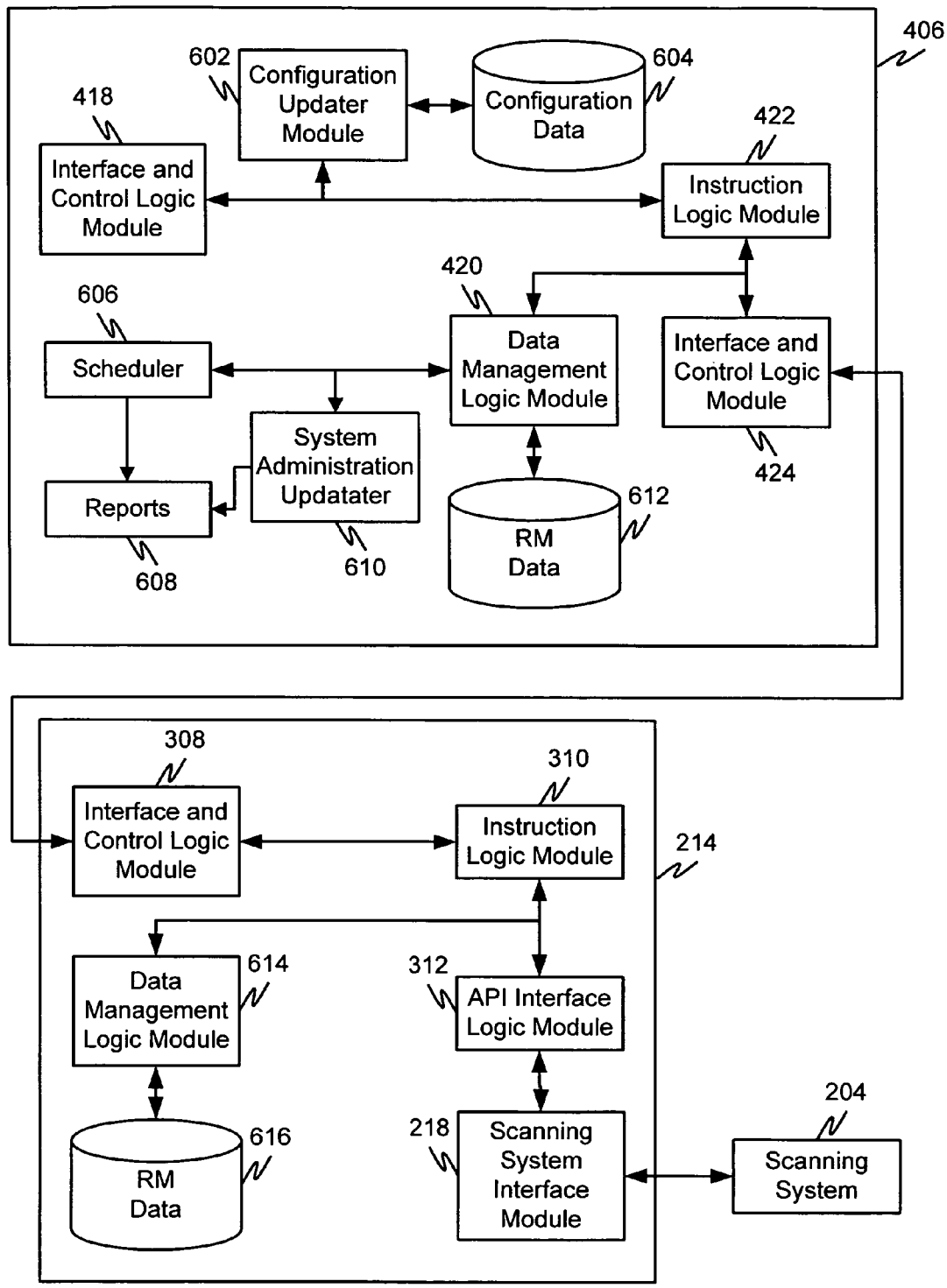
FIG. 6 is a functional block diagram of an exemplary embodiment of a remote management module in accordance with the present invention.

FIG. 6 is a functional block diagram of an exemplary embodiment of a remote management module in accordance with the present invention. In particular, a command and control center remote management module 406 is shown connected to a threat scanning machine remote management module 214. The command and control center remote management module 406 comprises an interface and control logic module 418, a configuration updater 602, a configuration database 604, a scheduler 606, a system administration updater 610, one or more reports 608, an instruction logic module 422, a data management logic module 420, remote management database 612 and interface and control logic module 424. The threat scanning machine remote management module 214 comprises an interface and control logic module 308, an instruction logic module 310, a data management logic module 614, a remote management database 616, an API interface logic module 312, and a scanning system interface module 218.

Figure 7:
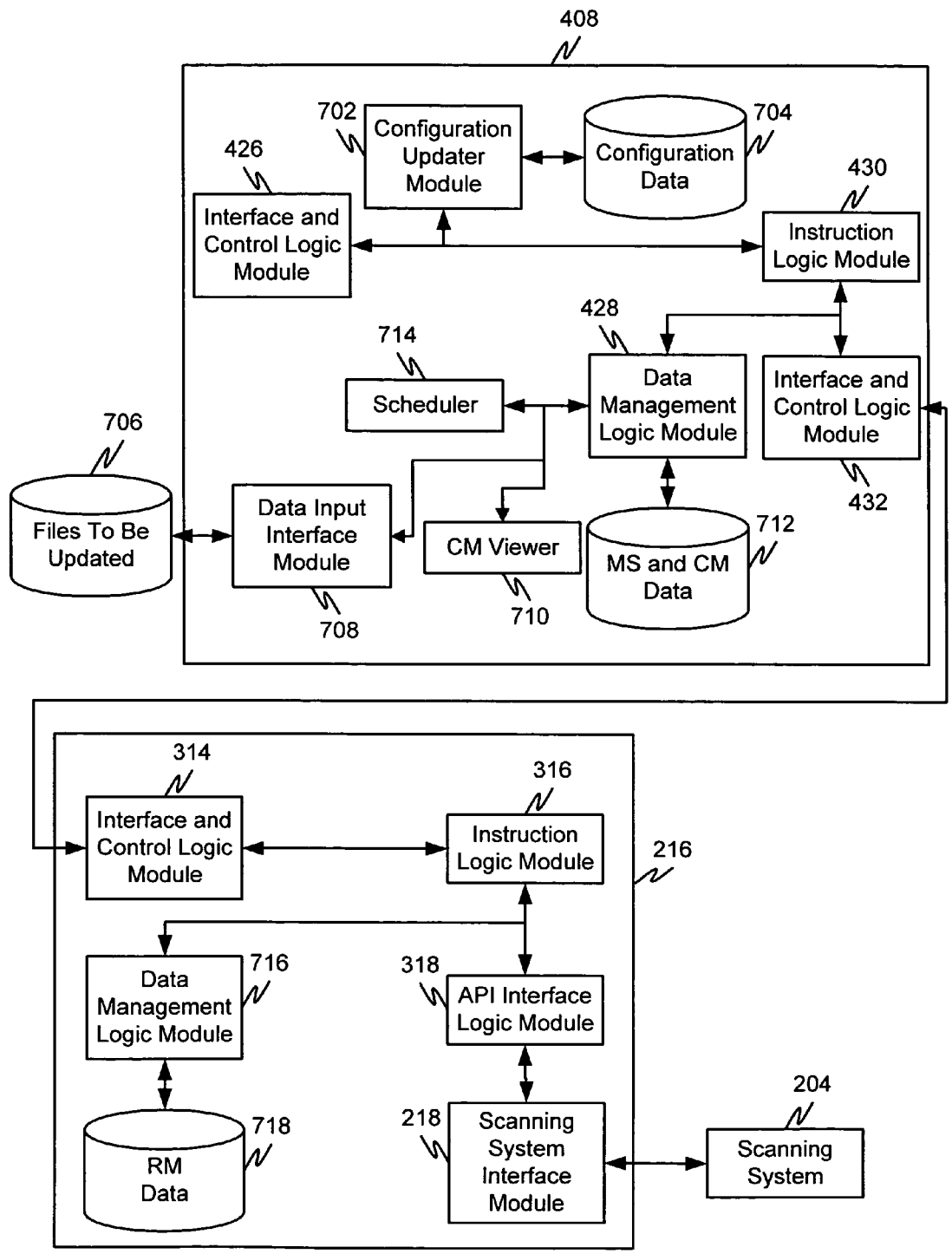
FIG. 7 is a functional block diagram of an exemplary embodiment of a maintenance server module in accordance with the present invention.

FIG. 7 is a functional block diagram of an exemplary embodiment of a maintenance server module in accordance with the present invention. In particular, a command and control center maintenance server module 408 is shown connected to a threat scanning machine maintenance server module 216. The command and control center maintenance server module 408 comprises an interface and control logic module 426, a configuration updater 702, a configuration database 704, a configuration management viewer 710, a data input interface 708, one or more data files 706, an instruction logic module 430, a data management logic module 428, maintenance server and configuration database 712, a scheduler module 714 and an interface and control logic module 432. The threat scanning machine threat management module 216 comprises an interface and control logic module 314, an instruction logic module 316, a data management logic module 716, a maintenance server database 718, an API interface logic module 318 and a scanning system interface module 218.

Figure 8:
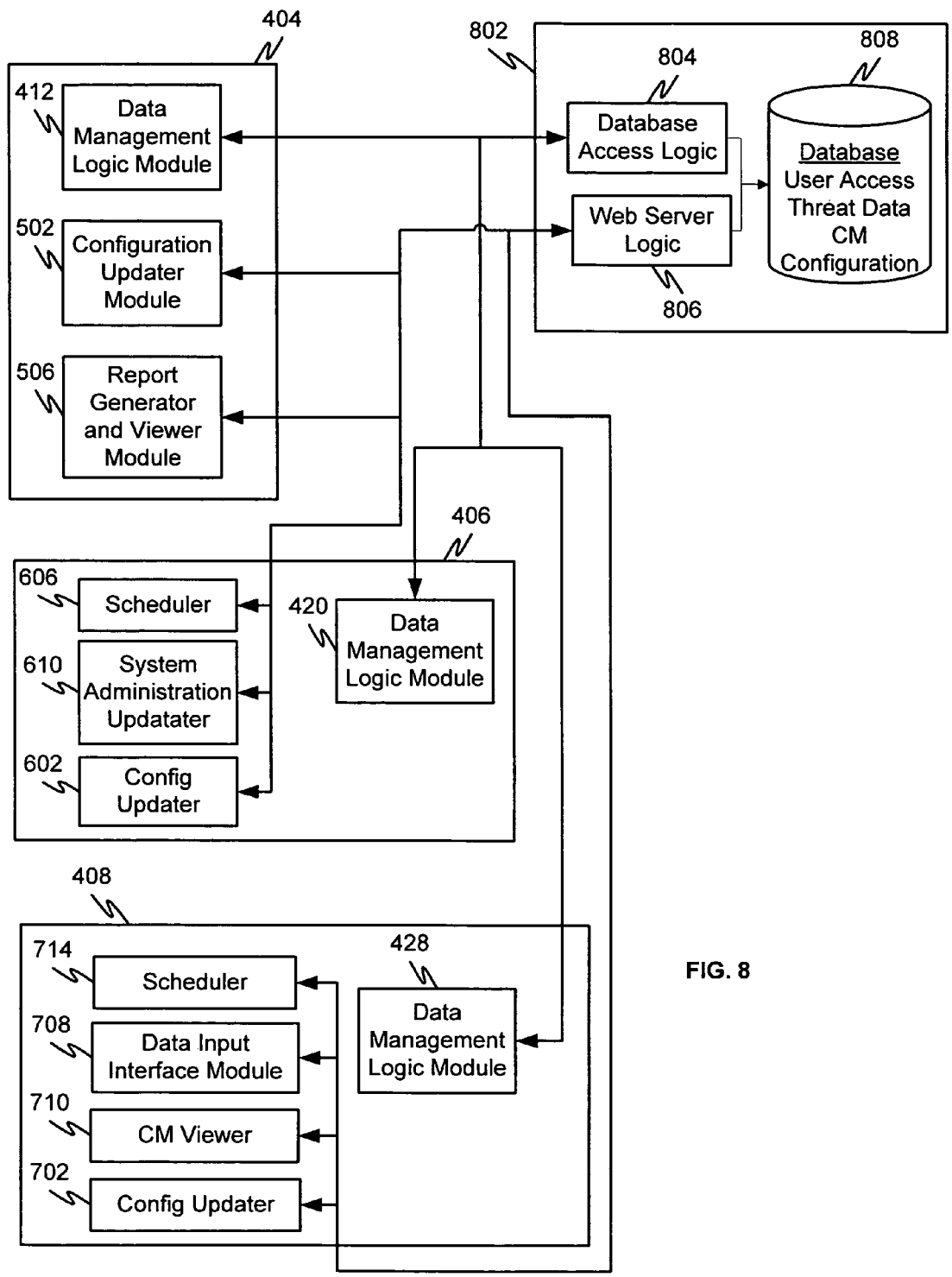
FIG. 8 is a functional block diagram of an exemplary embodiment of a control center database and web service connections in accordance with the present invention.

FIG. 8 is a functional block diagram of an exemplary embodiment of a control center database and web service connections in accordance with the present invention. In particular, the maintenance and control system data store 802 comprises a database access logic module 804, a web server logic module 806 and a database 808. The data management logic modules 412, 420, and 428 of the threat management, remote management, and maintenance server modules, respectively, are connected to the database access logic module 804. The report generator and viewer 506 and the configuration updater 502 of the threat management module 404 are connected to the web server logic module 806. The system administration updater 610, the scheduler 606 and the configuration updater 602 of the remote management module 406 are connected to the web server logic module 806. The configuration management viewer 710, the scheduler 714, the data input interface 708 and the configuration updater 702 of the maintenance server 408 are connected to web server logic module 806. The web server logic module 806 is connected to the database 808.

In operation, the data management logic modules 412, 420, and 428 of the threat management, remote management, and maintenance server modules respectively communicate with the database access logic module 804. The database access logic module provides the interface connectivity to the database 808. The web server logic module 806 provides the command and control center with web service access to the database 808.

Figure 9:
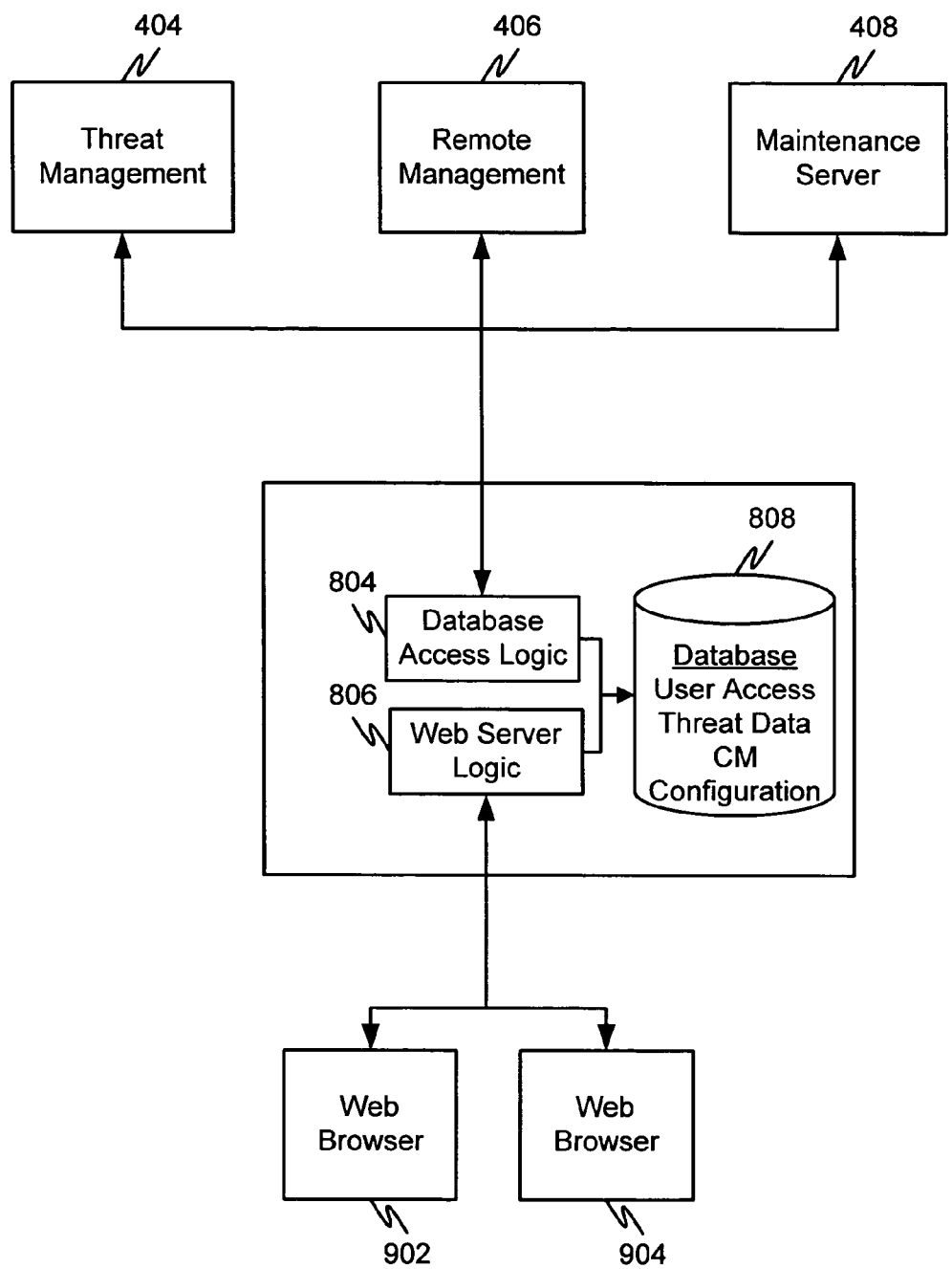
FIG. 9 is a functional block diagram of an exemplary control and maintenance system showing a web browser connection in accordance with the present invention.

FIG. 9 is a functional block diagram of an exemplary control and maintenance system showing a web browser connection in accordance with the present invention. In particular, web browsers 902 and 904 are shown connected to the web server logic module 806. While two web browsers are shown, it should be appreciated that multiple web browsers may connect to the web server logic module 806.

Figure 10:
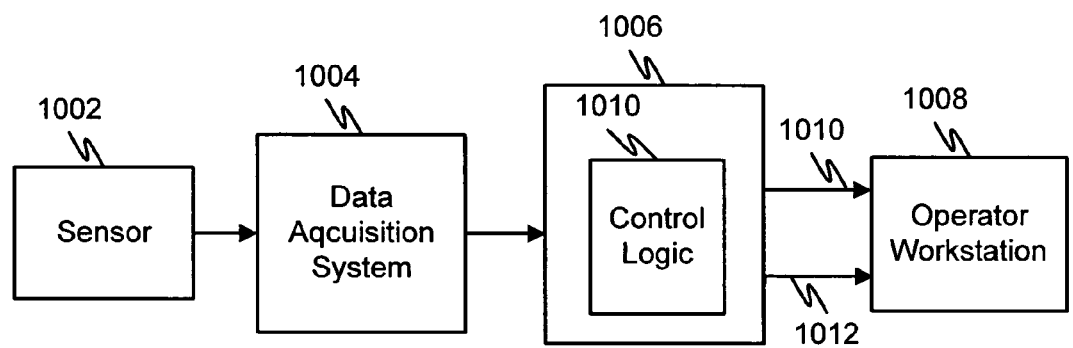
FIG. 10 is a functional block diagram of an exemplary threat scanning machine architecture in accordance with the present invention.

FIG. 10 is a functional block diagram of an exemplary threat scanning machine architecture. In particular, the threat scanning machine comprises a sensor 1002, a data acquisition system 1004, a reconstruction computer 1006, and an operator workstation 1008. The reconstruction computer 1006 comprises a control logic module 1010. The operator workstation 1008 presents a graphical user interface to the operator of the threat scanning machine.

In operation, raw data from the sensor 1002 is collected by the data acquisition system 1004. The raw data is then transmitted to the reconstruction computer 1006. The reconstruction computer 1006 processes the raw data and may provide a three-dimensional image or a two-dimensional image to the operator workstation 1008. In a threat scanning machine adapted to be used with the maintenance and control system, the software for the maintenance and control system resides on the operator workstation 1008. The threat scanning machine management system can download software or data to the reconstruction computer 1006, operator workstation 1008, and/or other components of the threat scanning machine that may require software or data to operate.

Figure 11:
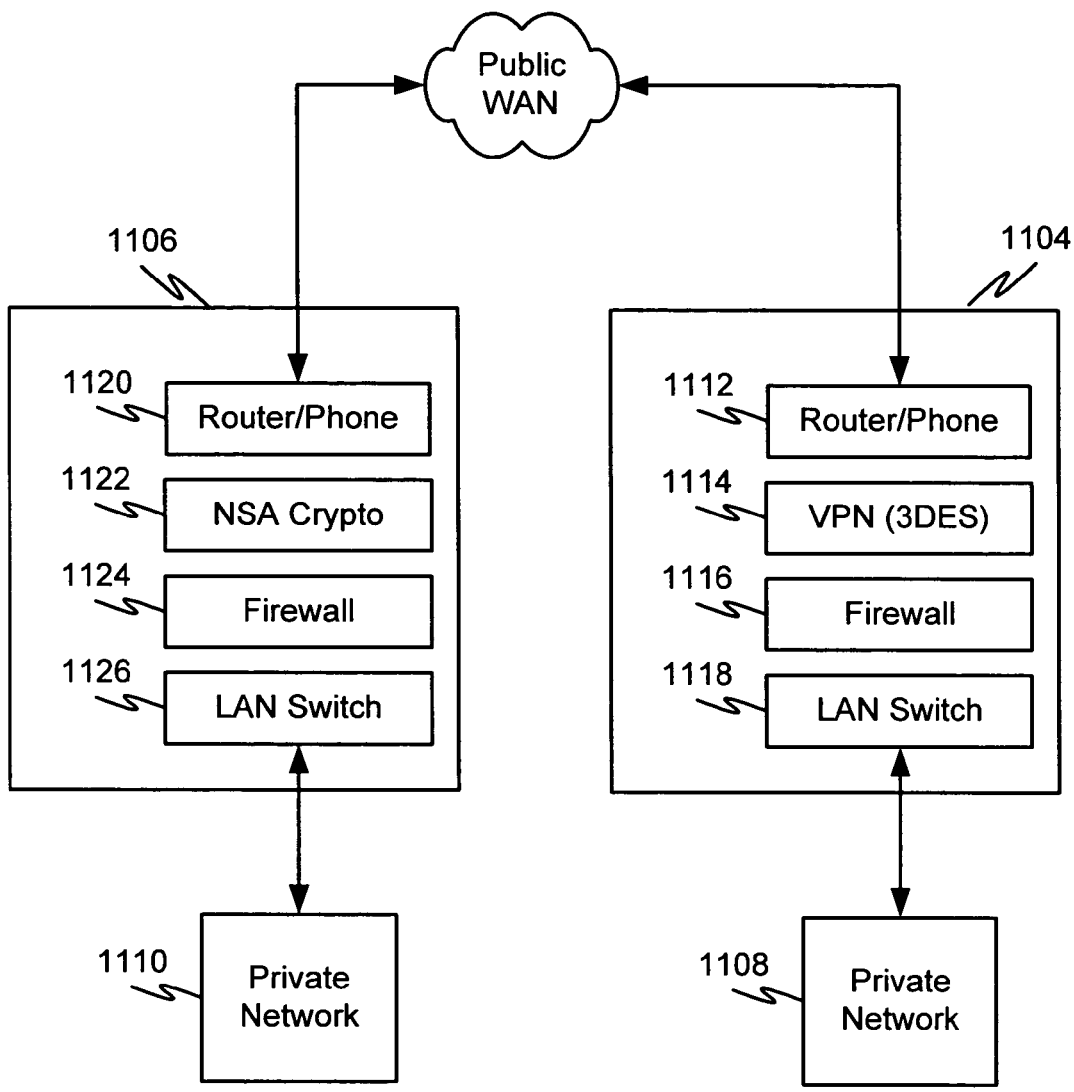
FIG. 11 is a functional block diagram of an exemplary embodiment of the threat scanning machine management system showing an exemplary approach to network security in accordance with the present invention.

FIG. 11 is a functional block diagram of an exemplary embodiment of the threat scanning machine management system showing an exemplary approach to network security for two different levels of security, confidential and secret. In particular, the public network 1102, for example a wide area network (WAN), is connected to both a confidential communications system 1104 and a secret communications system 1106. The confidential communications system comprises a router 1112, a triple data encryption standard (3DES) virtual private network connection 1114, a firewall 1116 and a local area network (LAN) switch 1118. An exemplary private network 1108 is connected to the LAN switch 1118. The secret communications system 1106 comprises a router 1120, a National Security Agency (NSA) cryptographic processor 1122, a firewall 1124, and a LAN switch 1126. A private network 1110 is connected to the LAN switch 1126.

Figure 12:
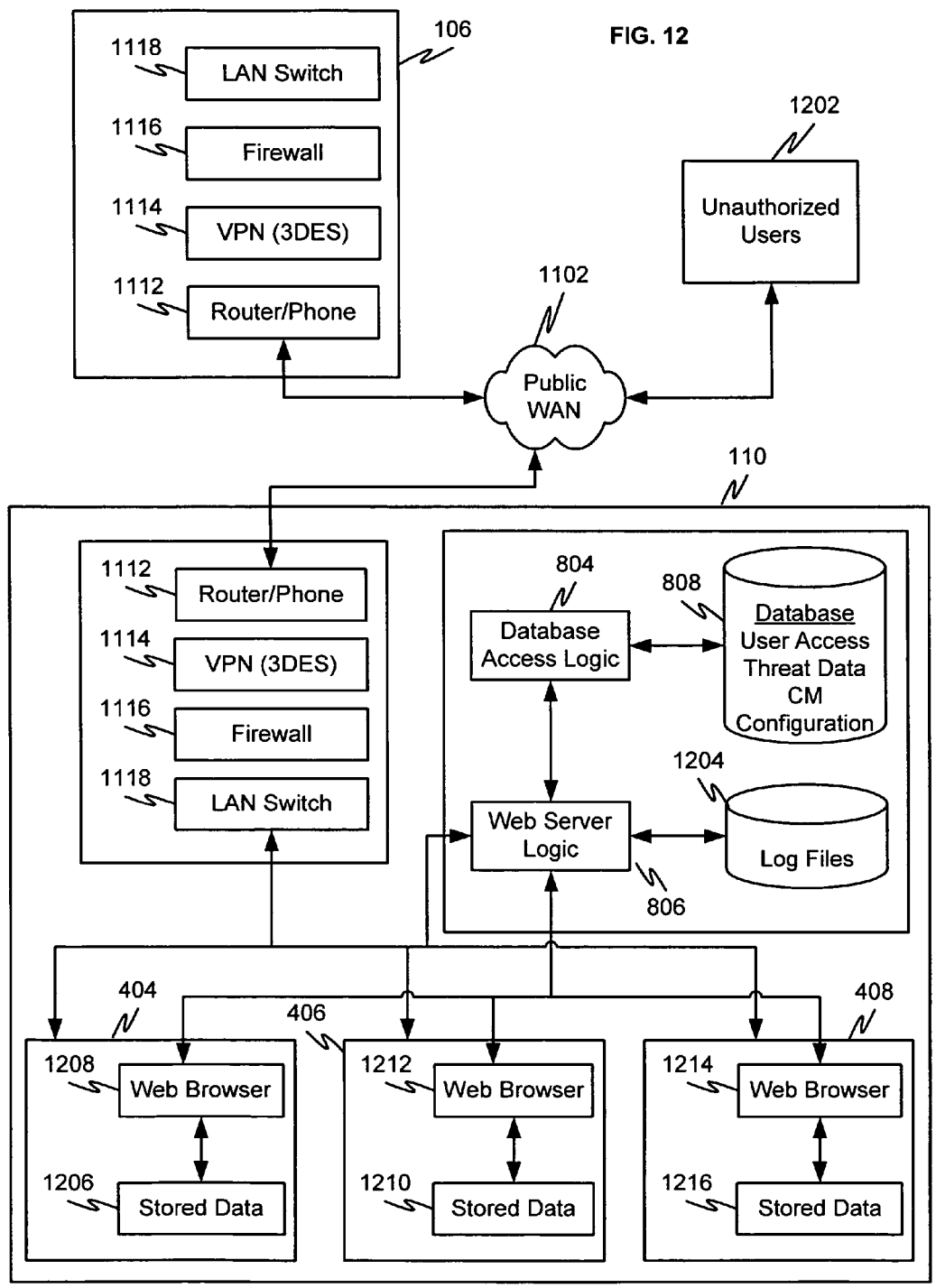
FIG. 12 is a functional block diagram of an exemplary embodiment of the threat scanning machine management system showing exemplary security components in accordance with the present invention.

FIG. 12 is a functional block diagram of an exemplary embodiment of the threat scanning machine management system showing exemplary security components in accordance with the present invention. In particular, a threat scanning machine 106 is connected to the public wide area network (WAN) 1102. A command and control center 110 is also connected to the public WAN 1102. Unauthorized users 1202 may be connected to the public wide area network. The threat scanning machine communications system comprises a router/phone 1112, an encryption module 1114 or 1120 depending on the level of security, a firewall 1116, and a local area network (LAN) switch 1118. The command and control center 110 comprises a threat management computer 404, a remote management computer 406, a maintenance server computer 408, a web server logic module 806, log files 1204, a database 808, a router/phone 1112, an encryption device 1114 or 1120 depending on the level of security required, a firewall 1116 and a LAN switch 1118.

In operation, the unauthorized users 1202 are restricted from accessing the threat scanning machine 106 or the command and control center 110. While the encryption devices 1114 or 1120, permit the threat scanning machine 106 and the command and control center 110 to communicate in a secure manner.

Figure 13A:
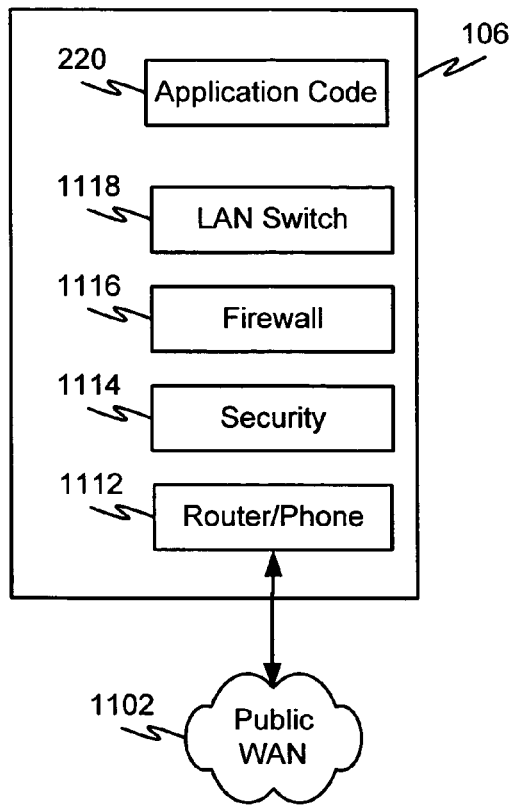
FIGS. 13A and 13B are a functional block diagram of an exemplary embodiment of the threat scanning machine management system showing exemplary alternative approaches to the network connection of security equipment in accordance with the present invention.
Figure 13B:
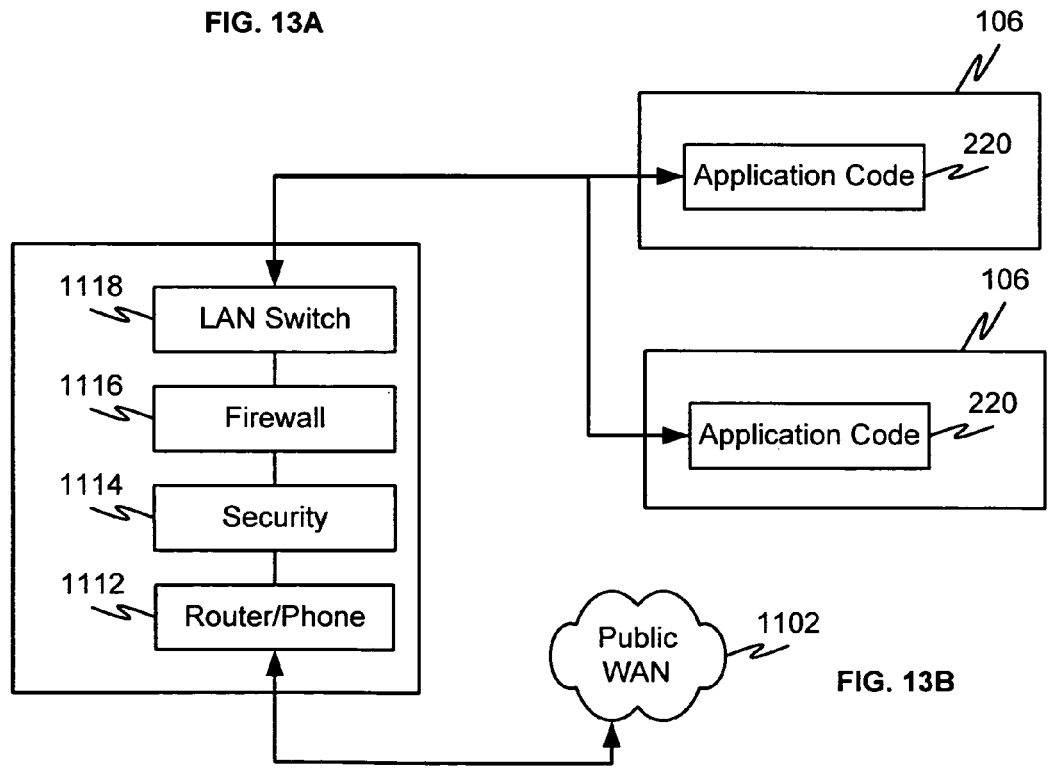

FIG. 13 is a functional block diagram of an exemplary embodiment of the threat scanning machine management system showing exemplary alternative approaches to the network connection of security equipment in accordance with the present invention. In particular, FIG. 13 shows two approaches to network security within a transportation facility. In FIG. 13A, the threat scanning machine 106 requires the security hardware and software to be present with the threat scanning machine. In FIG. 13B, there is one set of security hardware and software for an entire facility and the threat scanning machines 106 are all interconnected to the one set of communications security hardware and software.

In FIG. 13A, the threat scanning machine comprises application code 220, a local area network switch 1118, a firewall 1116, an encryption device 1114 or 1120 depending on the level of security required, and a router/phone 1112. In operation the threat scanning machine 106 containing its own set of communications security hardware and software is able to be directly connected to the public wide area network 1120.

In FIG. 13B, the communications security hardware and software may be placed in a central locations and accessed by one or more threat scanning machines 106. The communications equipment comprises a local area network switch 1118, a firewall 1116, an encryption device 1114 or 1120 depending on the level of security required, and a router/phone 1112. The threat scanning machines 106 each contain their own application code 220. The threat scanning machine are interconnected to the communications security equipment via the LAN switch 1118.

In operation, each threat scanning machine 106 communicates through the LAN switch 1118 to the communications security hardware and software in order to access the public wide area network 1102.

Figure 14:
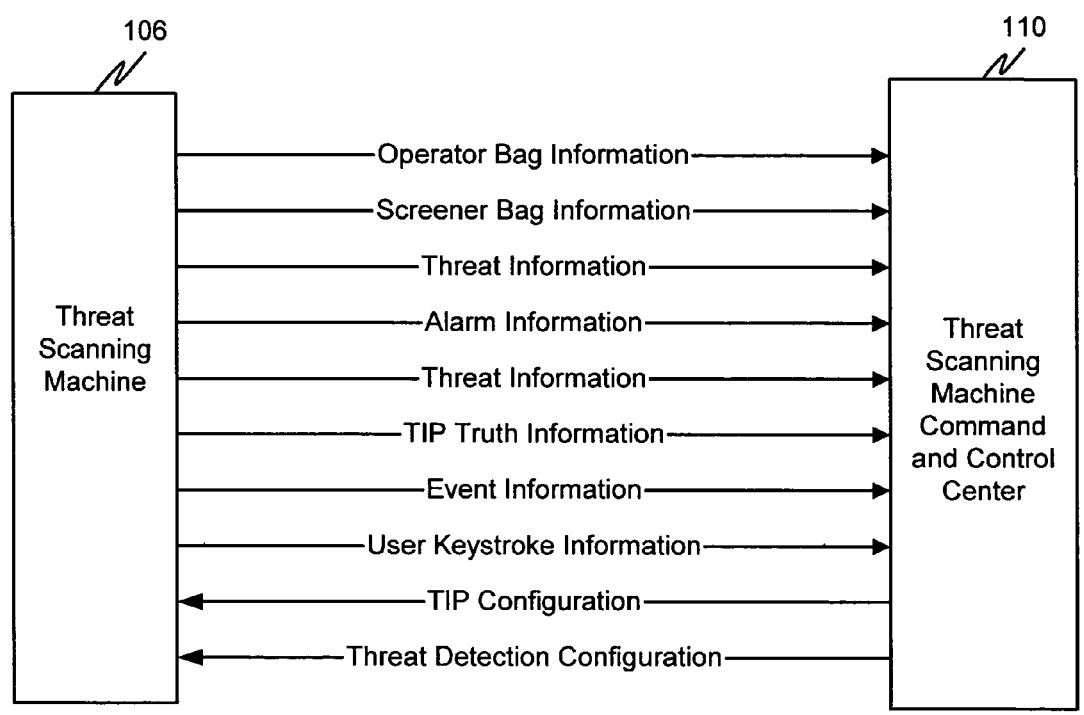
FIG. 14 is a functional block diagram of an exemplary message interface between a threat scanning machine and the threat scanning machine management system in accordance with the present invention.

FIG. 14 shows a functional block diagram of a threat scanning machine 106 interconnected with a command and control center 110. In particular, FIG. 14 shows an exemplary message interface between the threat scanning machine 106 and the command and control center 110 in accordance with the messages described in Tables 1 through 7 above.

In operation, the threat scanning machine 106 provides the following message to the command and control center 110: operator bag information, the screener bag information, the threat information, alarm information, TIP truth information, event information, and user keystroke information. The command and control center 110 provides the following messages to the threat scanning machine 106, TIP configuration and threat detection configuration.

One way that the personnel using a threat scanning machine management system can interact with the system is through computer adapted to provide a graphical user interface. The following is a description of an exemplary graphical user interface in accordance with the present invention. However, it should be appreciated that the graphical user interface shown in the figures is provided for illustrative purposes. A particular embodiment of the invention may have a graphical user interface that is implemented, configured, or adapted differently depending on the contemplated uses of the invention.

Figure 15:
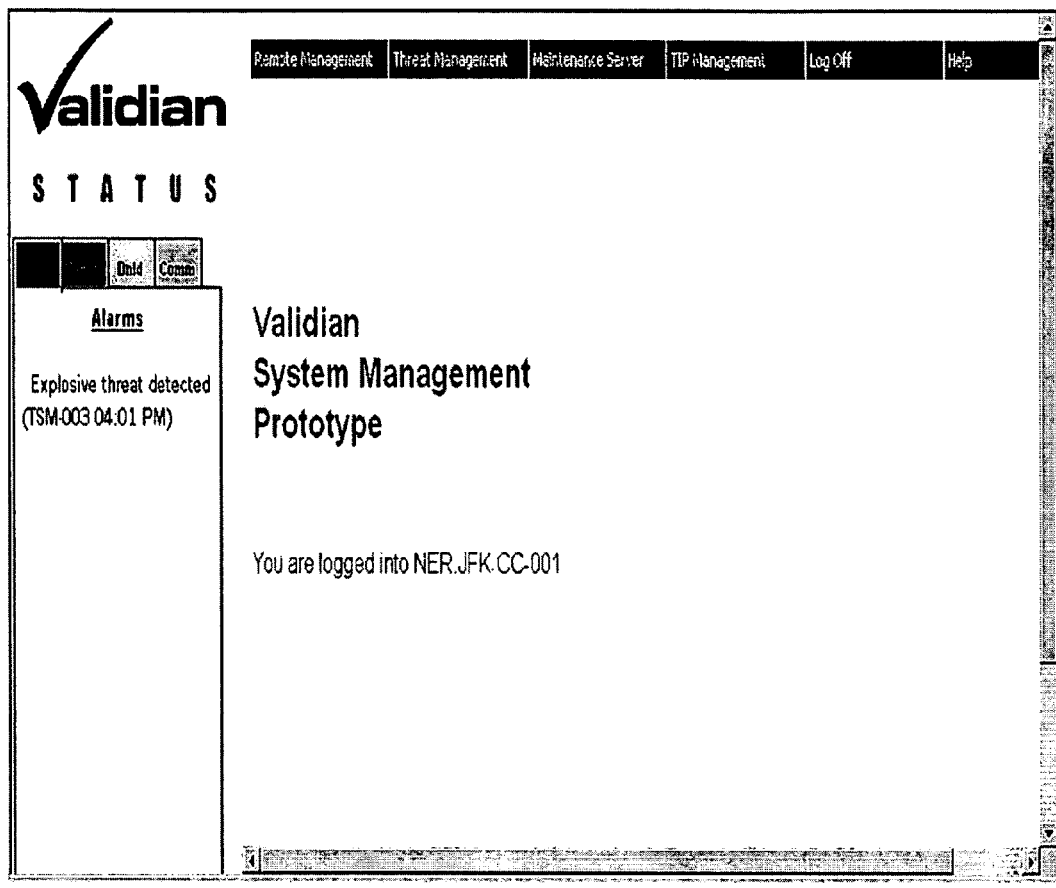
FIG. 15 is an illustration of an exemplary embodiment of the threat scanning machine management system user interface showing the main menu screen.

FIG. 15 is an illustration of an exemplary user interface for the threat scanning machine management system showing the main menu screen. In particular, the main menu comprises Remote Management, Threat Management, Maintenance Server, TIP Management, Log Off, and Help choices. There is also shown in FIG. 15 a tab style user interface element comprises the tabs choices of Alarms, Events, Dnld (an abbreviation for download), and Comm (an abbreviation for communications).

Figure 16:
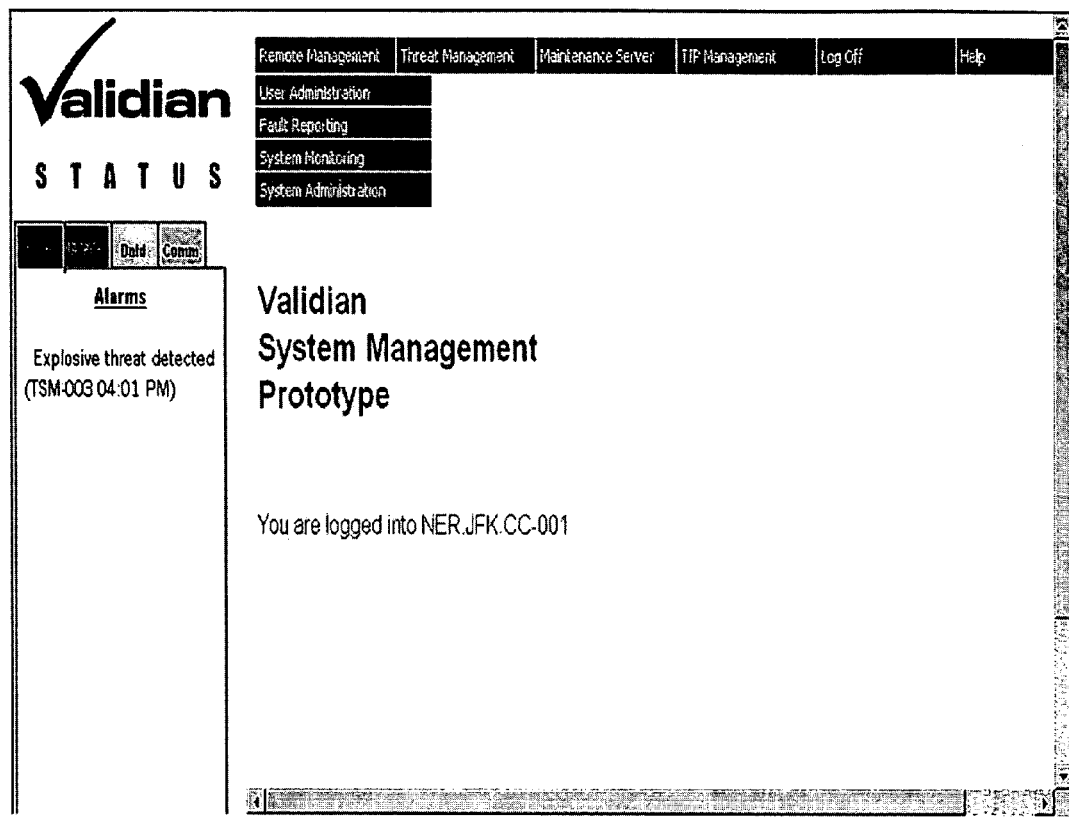
FIG. 16 is an illustration of an exemplary embodiment of the threat scanning machine management system user interface showing the items of the Remote Management menu.

If the user selects the Remote Management menu choice, the Remote Management menu will be displayed. FIG. 16 is an illustration of an exemplary user interface for the threat scanning machine management system showing the items available under the Remote Management menu choice. In particular, the Remote Management menu comprises User Administration, Fault Reporting, System Monitoring, and System Administration choices.

Figure 17:
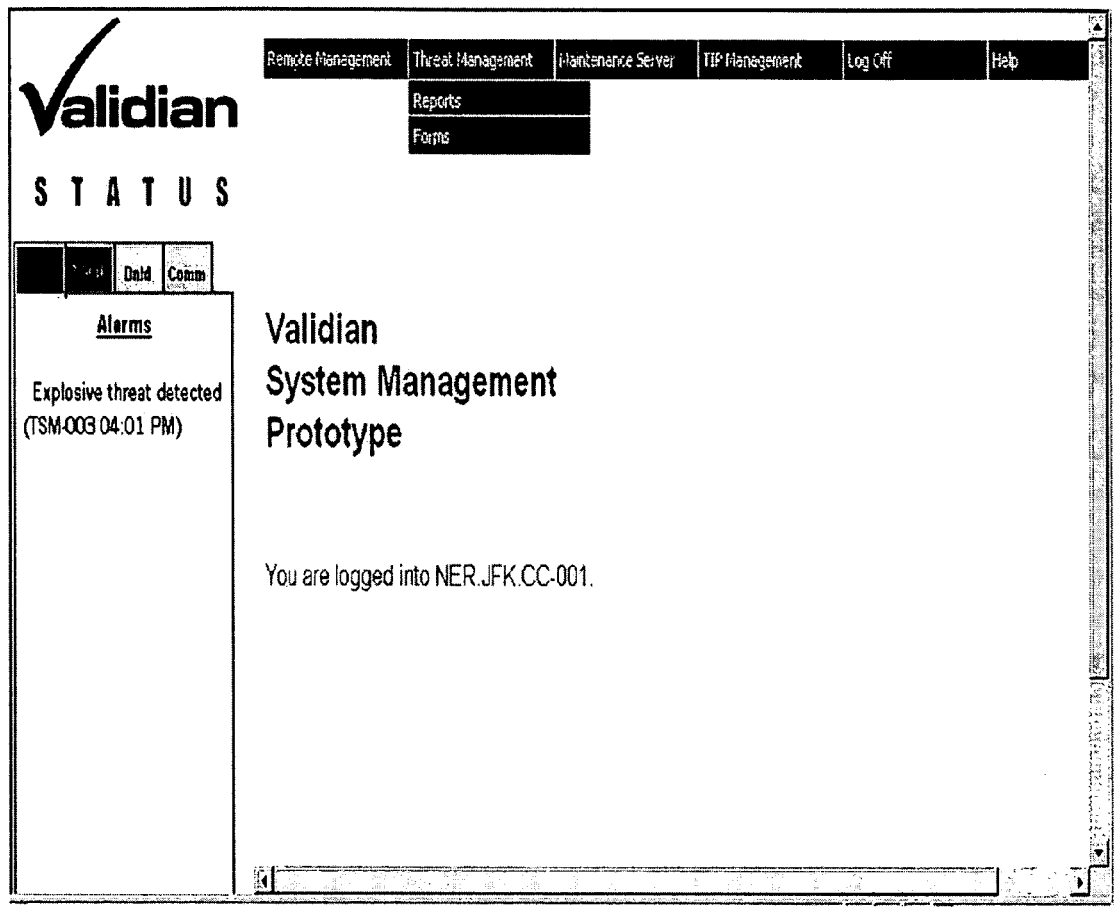
FIG. 17 is an illustration of an exemplary embodiment of the threat scanning machine management system user interface showing the items of the Threat Management menu.

If the user selects, from the main menu, the Threat Management menu choice, the Threat Management Menu will be displayed. FIG. 17 is an illustration of an exemplary user interface for the threat scanning machine management system showing the items available under the Threat Management menu choice. In particular, the Threat Management menu comprises Reports and Forms menu choices.

Figure 18:
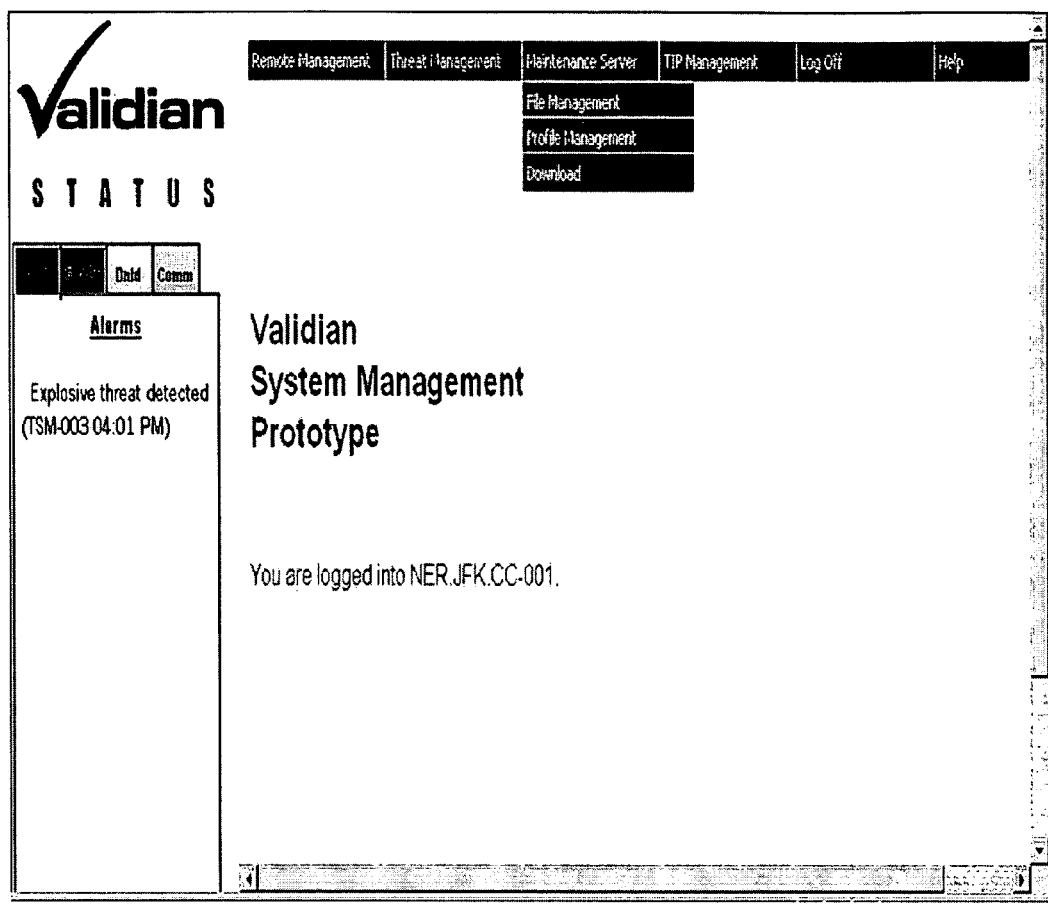
FIG. 18 is an illustration of an exemplary embodiment of the threat scanning machine management system user interface showing the items of the Maintenance Server menu.

If the user selects, from the main menu, the Maintenance Server menu choice, the Maintenance Server menu will be displayed. FIG. 18 is an illustration of an exemplary user interface for the threat scanning machine management system showing the items available under the Maintenance Server menu choice. In particular, the Maintenance Server menu comprises File Management, Profile Management, and Download menu choices.

Figure 19:
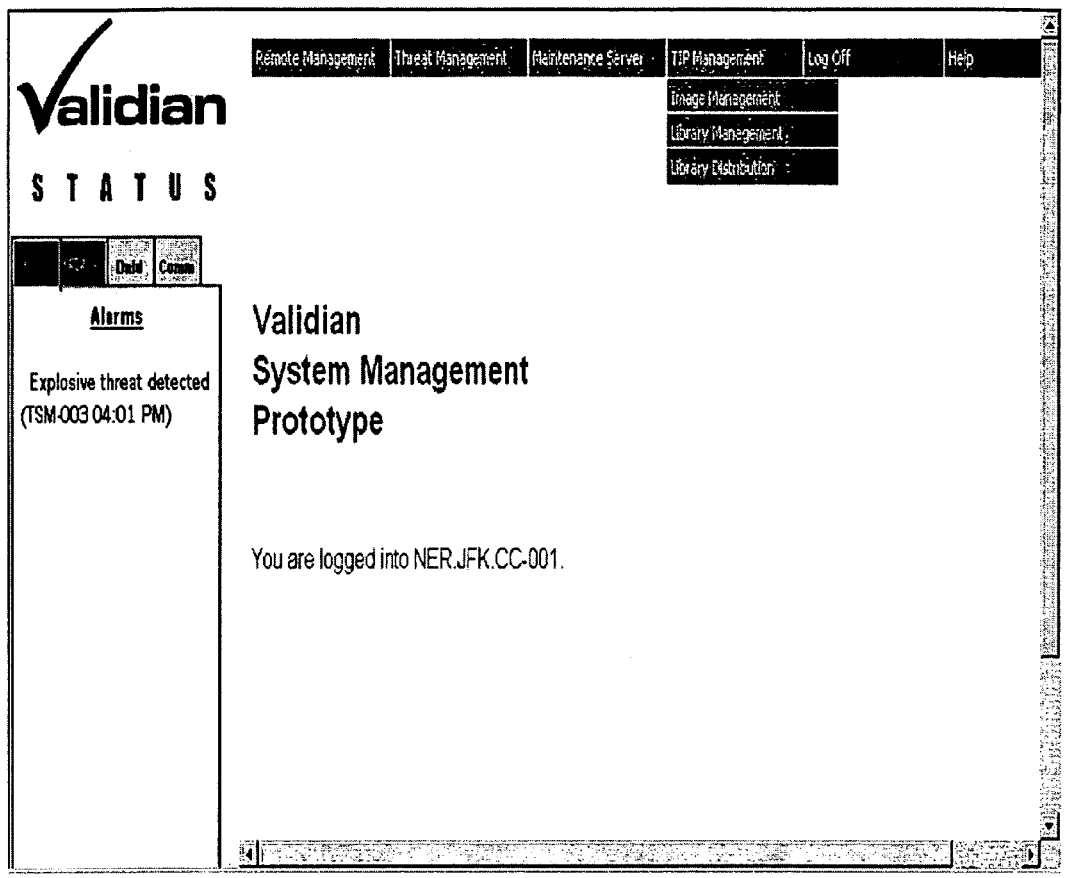
FIG. 19 is an illustration of an exemplary embodiment of the threat scanning machine management system user interface showing the items of the Threat Image Projection (TIP) Management menu.

If the user selects, from the main menu, the TIP Management menu choice, the TIP Management menu will be displayed. FIG. 19 is an illustration of an exemplary user interface for the threat scanning machine management system showing the items available under the TIP Management menu choice. In particular, the TIP management menu comprises Image Management, Library Management, and Library Distribution menu choices.

If the user sects, from the main menu, the Log Off menu choice, the user will be logged of the system.

If the user selects, from the main menu, the Help menu choice, the user will be presented with information on how to operate the threat scanning machine management system.

Figure 20:
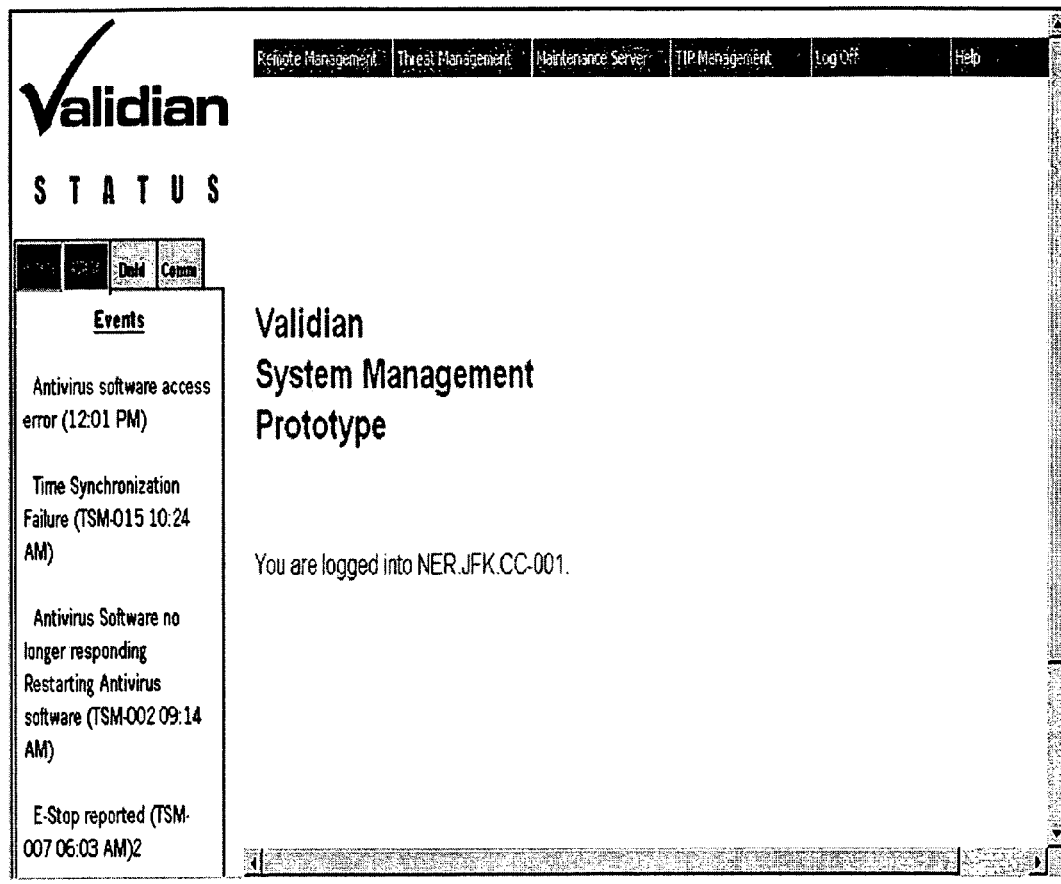
FIG. 20 is an illustration of an exemplary embodiment of the threat scanning machine management system user interface showing Event information.

FIG. 20 shows an exemplary Events tab screen. FIG. 26 shows an exemplary Comm (short for communications) tab screen. The tab screens allow the operator to quickly ascertain the status of important system functions.

Figure 21:
FIG. 21 is an illustration of an exemplary embodiment of the threat scanning machine management system user interface showing User Administration data.

Returning to the Remote Management menu of FIG. 16, if the user selects the User Administration menu choice, the User Administration screen will be displayed. FIG. 21 is an illustration of an exemplary user interface for the threat scanning machine management system showing the User Administration screen.

Figure 22:
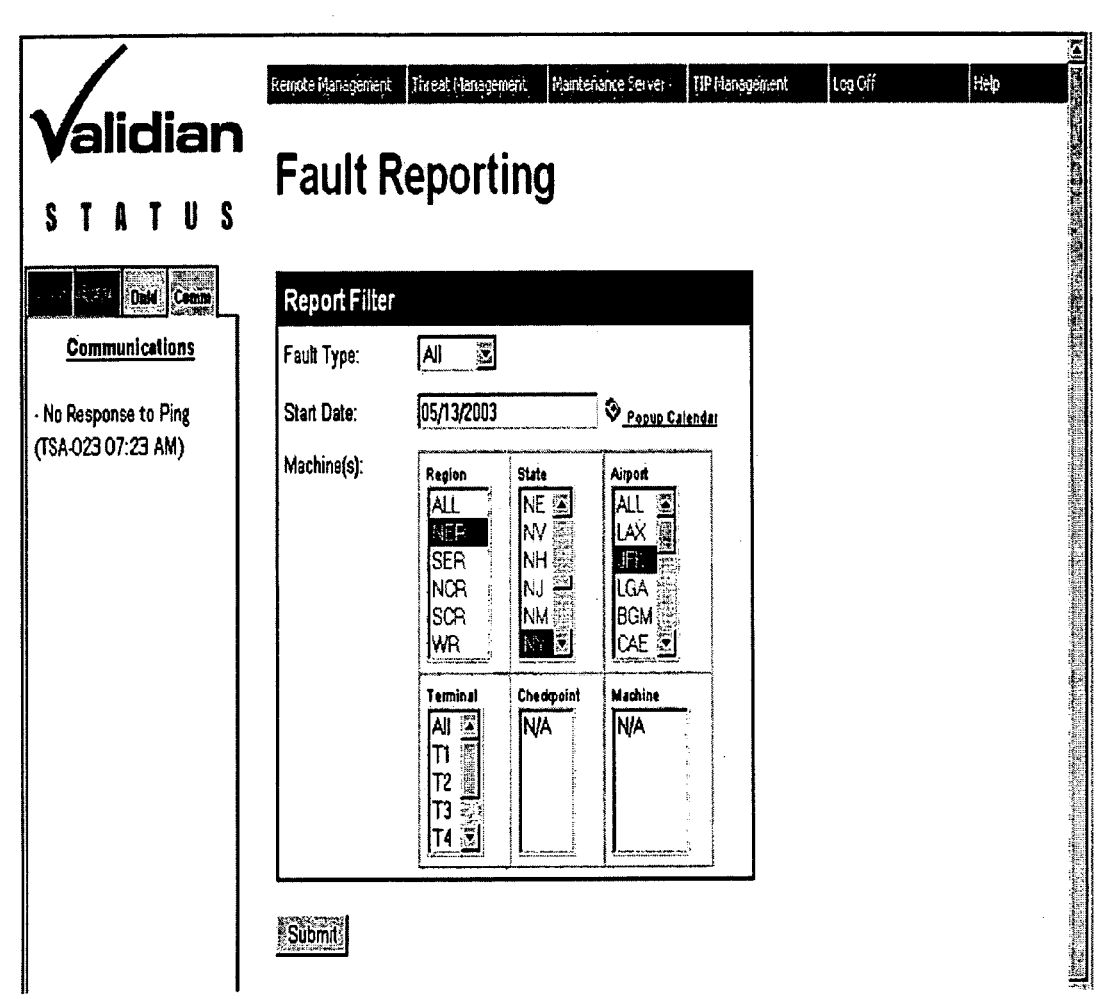

If the users selects, from the Remote Management menu, the Fault Reporting menu choice, the Fault Reporting dialog will appear. FIG. 22 is an illustration of an exemplary user interface for the threat scanning machine management system showing the Fault Reporting selection dialog interface.

Figure 23:
FIG. 23 is an illustration of an exemplary embodiment of the threat scanning machine management system user interface showing a Report Filter selection dialog.

If the user selects, from the Remote Management menu, the System Monitoring menu choice, the Performance Information dialog will be displayed. FIG. 23 is an illustration of an exemplary user interface for the threat scanning machine management system showing the Performance Information dialog.

Figure 24:
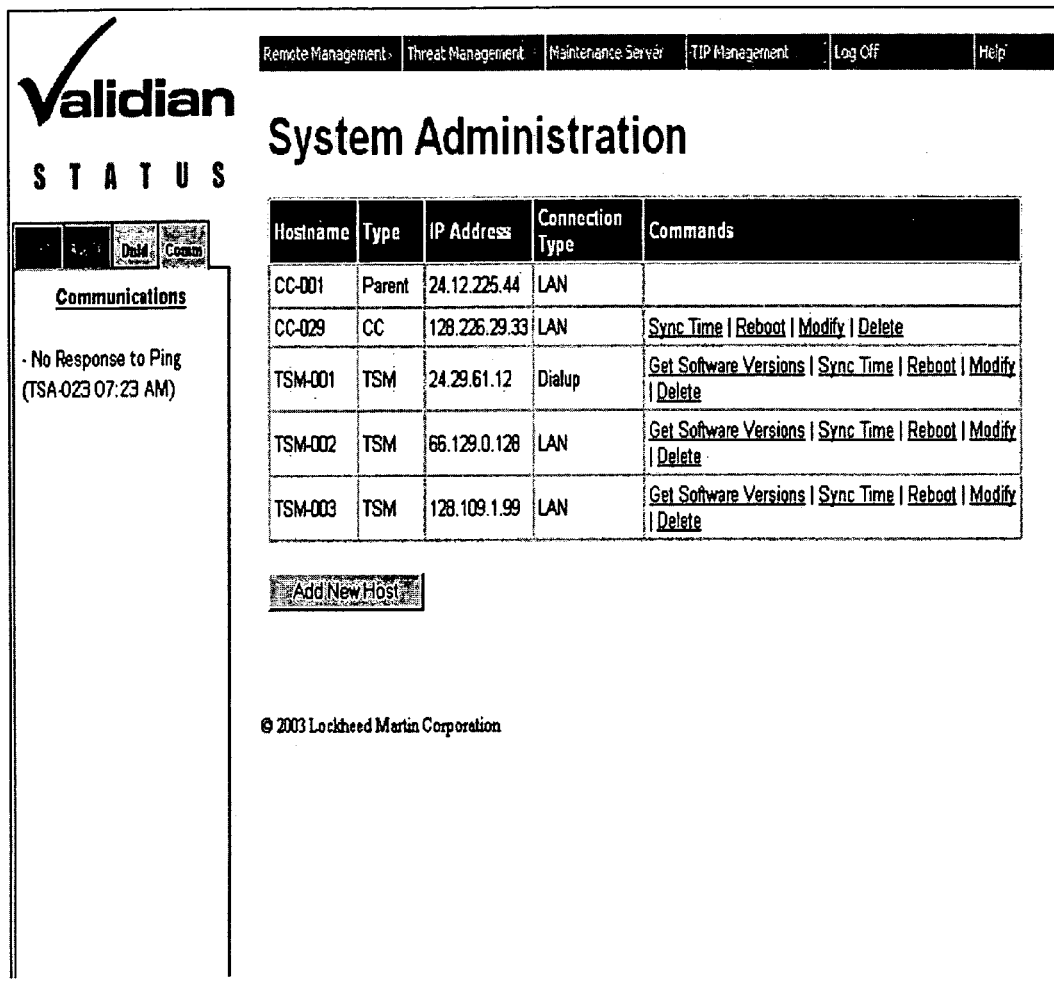
FIG. 24 is an illustration of an exemplary embodiment of the threat scanning machine management system user interface showing System Administration data.

If the user selects, from the Remote Management menu, the System Administration menu choice, the System Administration menu will be displayed. FIG. 24 is an illustration of an exemplary user interface for the threat scanning machine management system showing the System Administration screen.

Figure 27:
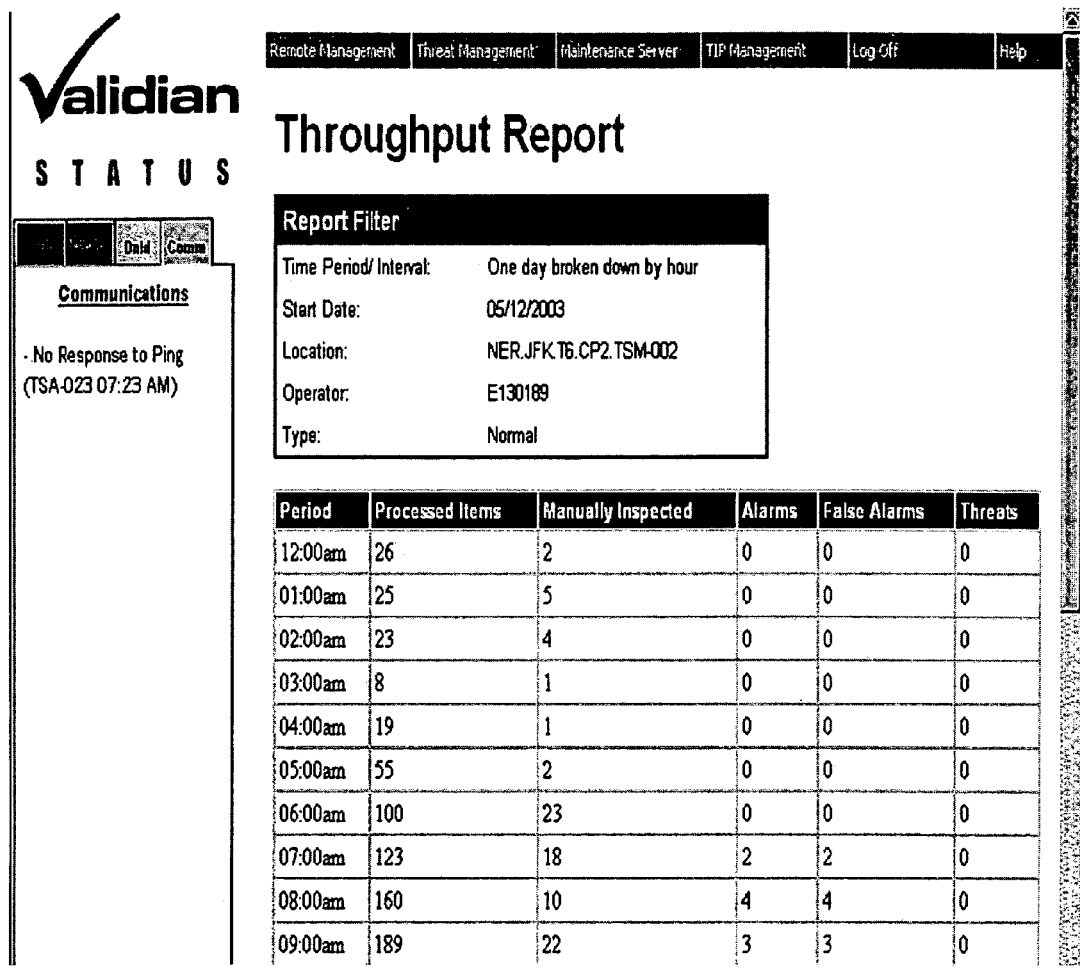
FIG. 27 is an illustration of an exemplary embodiment of the threat scanning machine management system user interface showing a Throughput Report.
Figure 29:
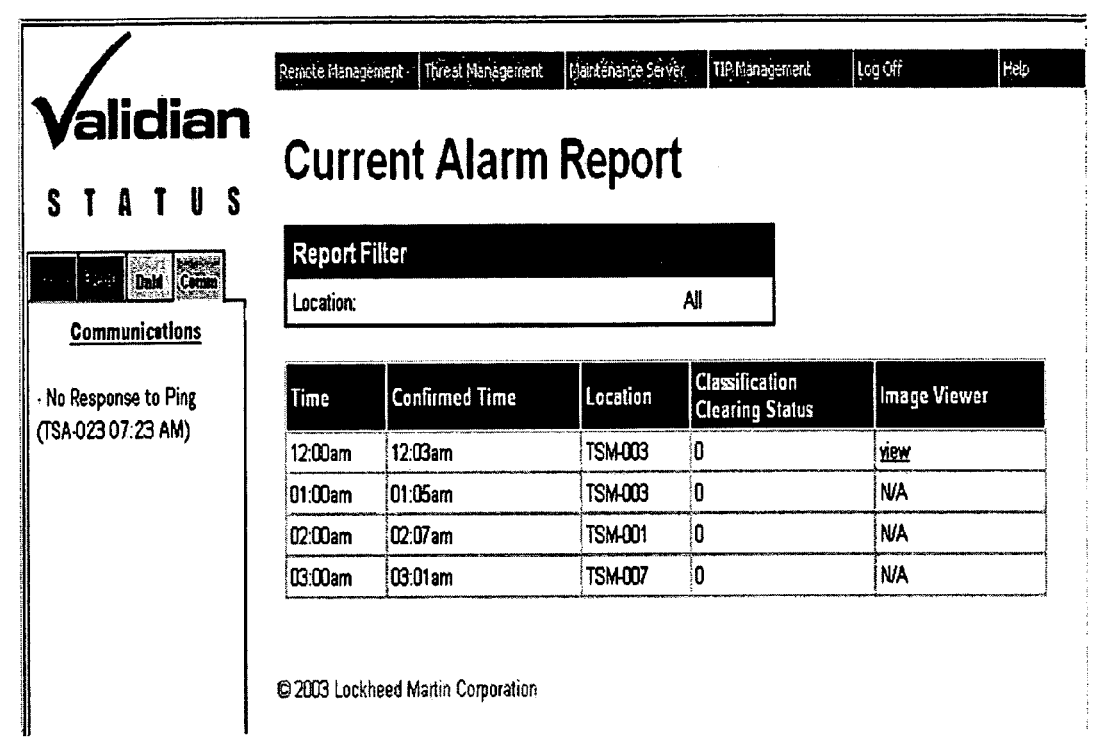

Turning now to the Threat Management menu shown in FIG. 17, if the user selects, from the Threat Management menu, the Reports menu choice, the reports selection will be displayed. Examples of the types of reports available include the Download Schedule shown in FIG. 25, the Throughput Report shown in FIG. 27, the Personnel Report shown in FIG. 28, the Current Alarm Report shown in FIG. 29, the Historical Bag/Threat Information Report shown in FIG. 30, the Threat Type Information Report shown in FIG. 31, the Fault Report shown in FIG. 37 and the All Actions Taken Information Report shown in FIG. 32.

Figure 33:
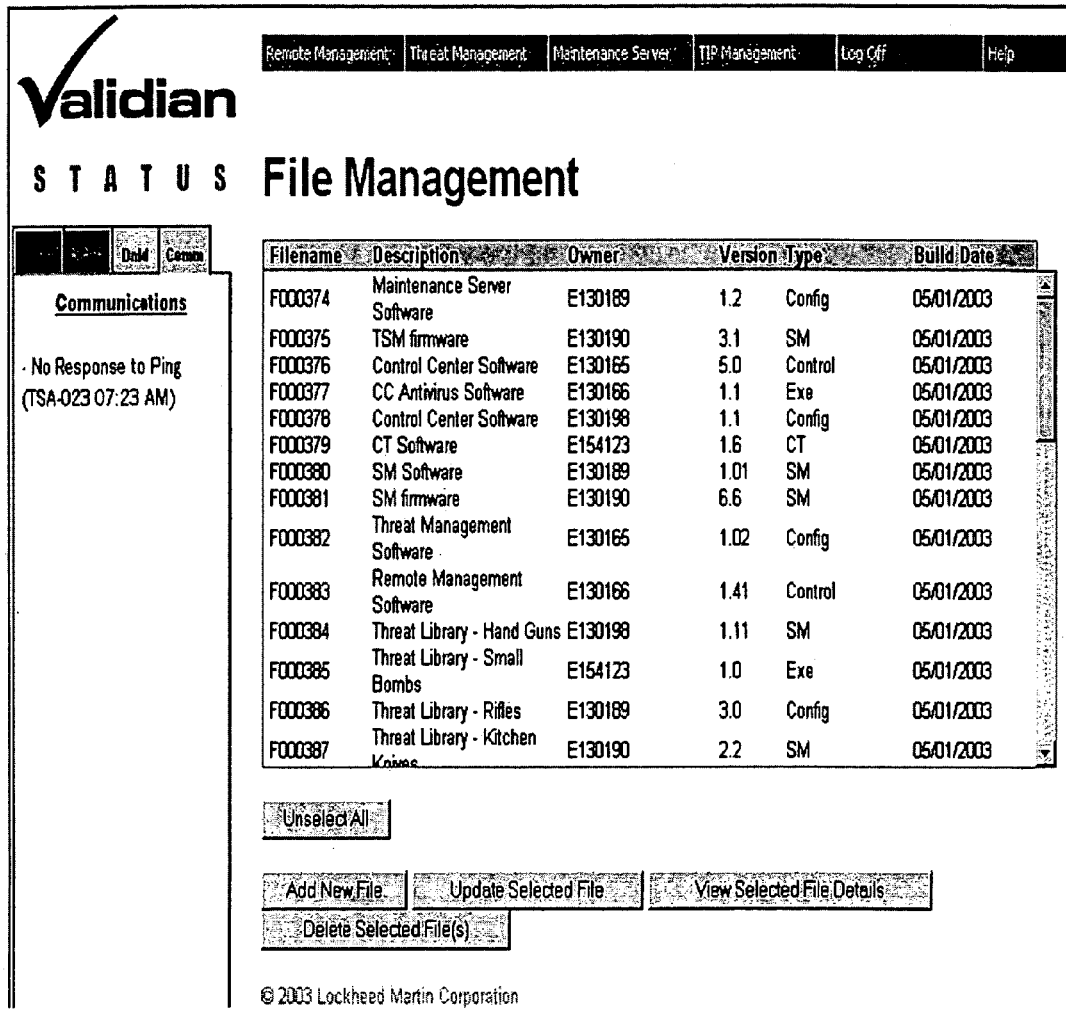
FIG. 33 is an illustration of an exemplary embodiment of the threat scanning machine management system user interface showing a File Management Report.

Turning now to the Maintenance Server menu shown in FIG. 18, if the user selects from the Maintenance Server menu, the File Management menu choice, the File Management screen will be displayed. FIG. 33 is an illustration of an exemplary user interface for the threat scanning machine management system File Management screen. From the File management screen, the user can add files.

Figure 34:
FIG. 34 is an illustration of an exemplary embodiment of the threat scanning machine management system user interface showing a Profile Management Report.

If the user selects, from the Maintenance Server menu, the Profile Management menu choice, the Profile Management screen will be displayed. FIG. 34 is an illustration of an exemplary user interface for the threat scanning machine management system showing the Profile Management screen. From the Profile Management screen, the user can define a profile comprising one or more files that require downloading. The profile is a way of bundling the files that require downloading together.

Figure 35:
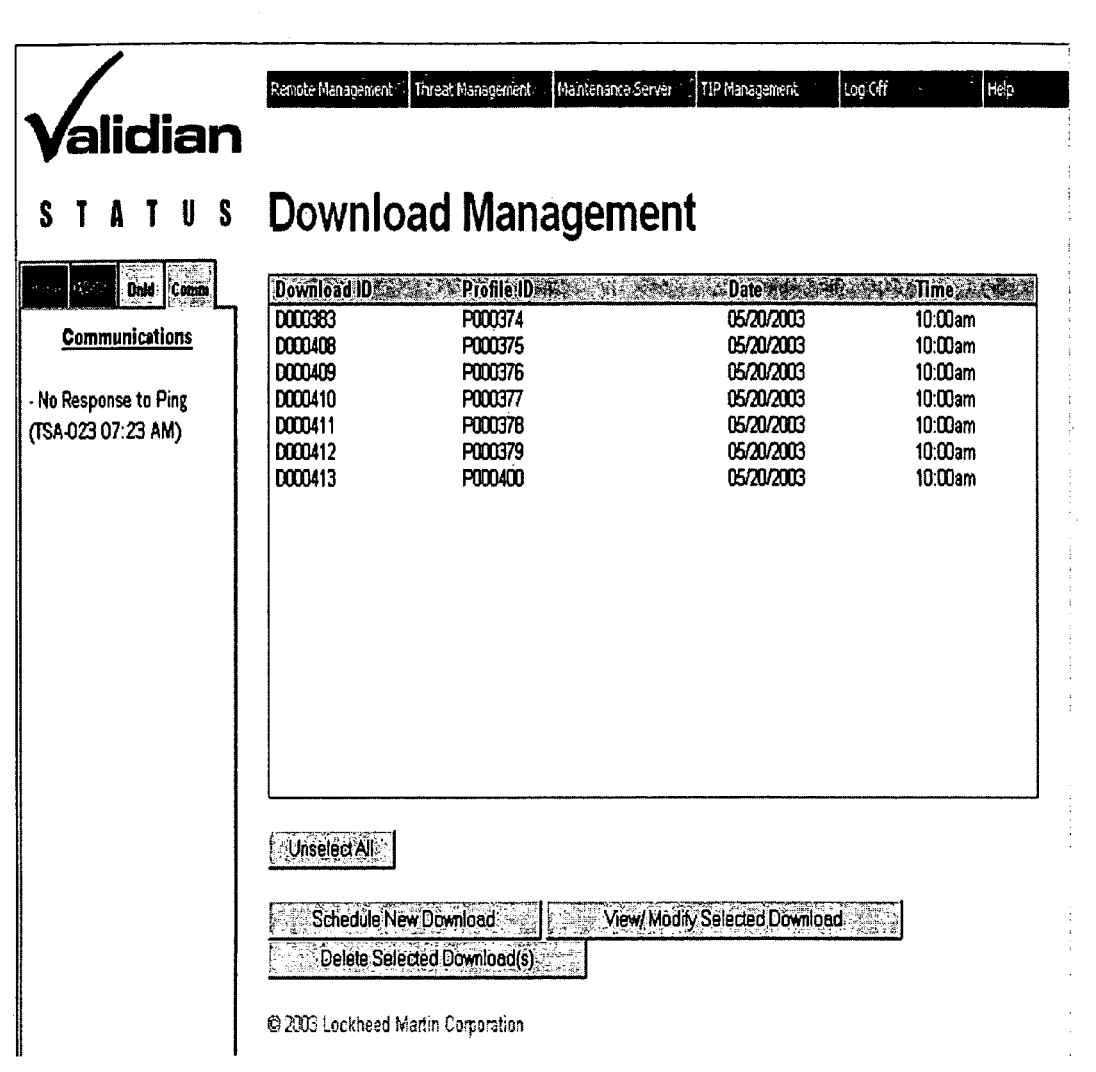

If the user selects, from the Maintenance Server menu, the Download menu choice, the Download Management screen will be displayed. FIG. 35 is an illustration of an exemplary user interface for the threat scanning machine management system showing the Download Management screen. Using the Download Management screen, the user can schedule a download of a previously defined profile.

Figure 36:
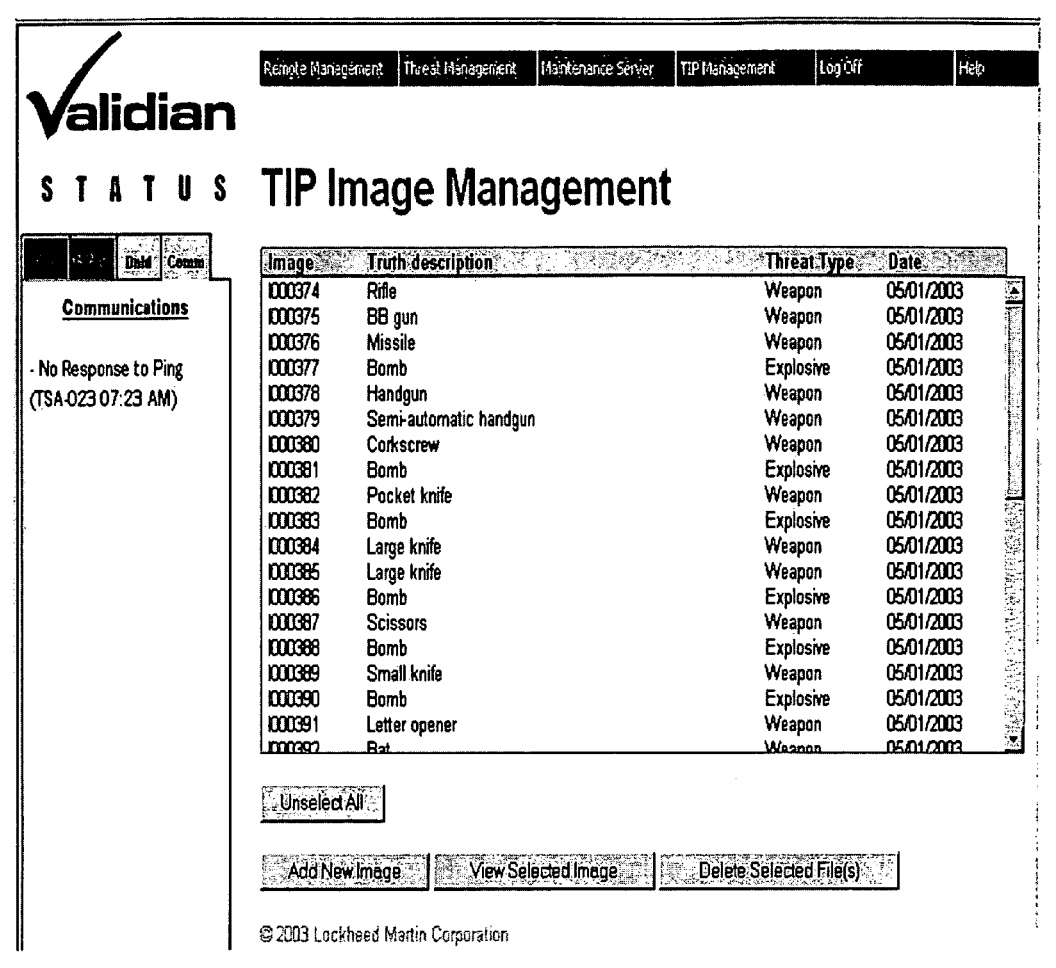

Turning now to the TIP Management menu shown in FIG. 19, if the user selects the Image Management option, the TIP Image Management screen will be displayed. FIG. 36 is an illustration of an exemplary user interface for the threat scanning machine management system showing the TIP Image Management screen.

Figure 37:
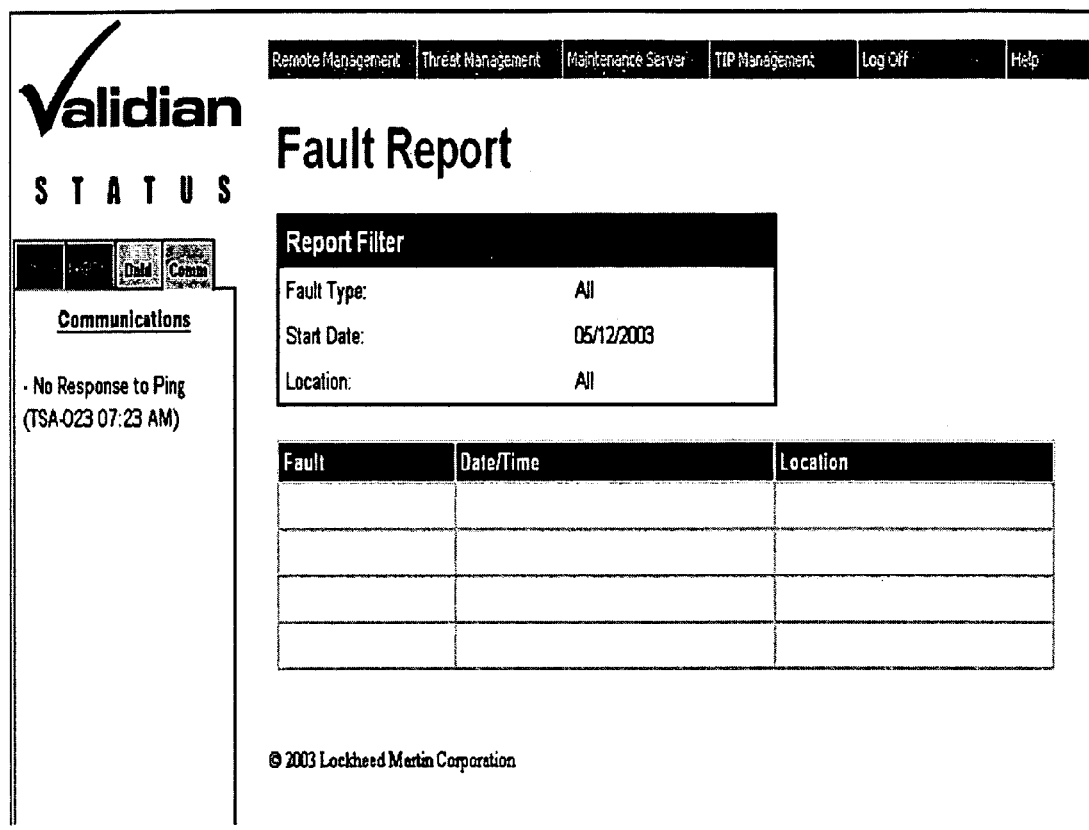
FIG. 37 is an illustration of an exemplary embodiment of the threat scanning machine management system user interface showing a Fault Report.

FIG. 37 shows an exemplary Fault Report screen. There are no faults shown in this example. However, if faults were present for the report criteria specified, such faults would be displayed in the table along with the pertinent fault details.

Figure 38:
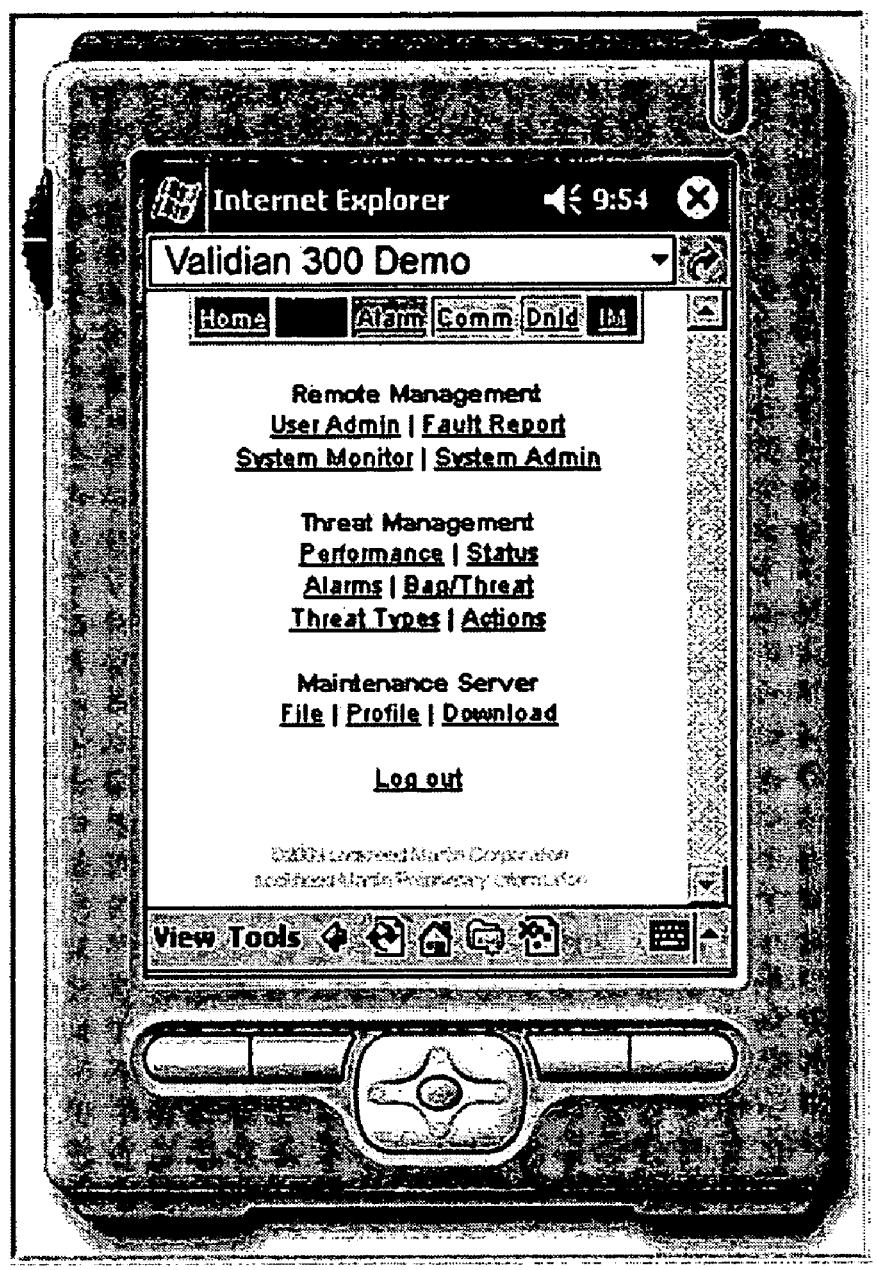
FIG. 38 is an illustration of an exemplary embodiment of the threat scanning machine management system user interface adapted for use on a handheld or portable computer showing the main menu screen.

FIG. 38 shows an exemplary threat scanning machine management system user interface that has been adapted to be displayed on a handheld computer, laptop computer, or the like. In particular, FIG. 38 is presented to show the main menu screen on a simulated handheld device. While the other screens are not shown on a handheld device is should be appreciated that the entire threat management system user interface may be adapted to use on handheld computer, laptop computer, portable computer, network enabled communications device, or any type of portable computing device.

As shown in the above figures, the threat scanning machine management system can be implemented on a general-purpose computer, a special-purpose computer, a programmed microprocessor or microcontroller and peripheral integrated circuit element, and ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions described herein can be used to implement a system for the management of threat scanning machines according to this invention.

Furthermore, the disclosed system may be readily implemented in software using object or object-oriented software development environments that provide portable source code that can be used on a variety of computer platforms. Alternatively, the disclosed system for managing threat scanning machines may be implemented partially or fully in hardware using standard logic circuits or a VLSI design. Other hardware or software can be used to implement the systems in accordance with this invention depending on the speed and/or efficiency requirements of the systems, the particular function, and/or a particular software or hardware system, microprocessor, or microcomputer system being utilized. The threat scanning machine management system illustrated herein can readily be implemented in hardware and/or software using any known or later developed systems or structures, devices and/or software by those of ordinary skill in the applicable art from the functional description provided herein and with a general basic knowledge of the computer and network communication arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated encoding/decoding system, or the like. The system can also be implemented by physically incorporating the system and method into a software and/or hardware system, such as the hardware and software systems of an image processor.

It is, therefore, apparent that there is provided in accordance with the present invention, systems and methods for managing threat scanning machines. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A dynamically configurable maintenance and control system for threat scanning machines located in an airport, the system comprising:
   a threat scanning machine in the airport, adapted to communicate via a network; and
   a control computer, adapted to communicate via the network with the threat scanning machine and to dynamically re-configure the system by selecting a threat scanning machine for addition to the system;
wherein said selecting is performed in real time in response to current conditions in the airport and wherein one or more control computers are connected to a central control computer and said one or more control computers are adapted to facilitate centralized maintenance and control of multiple threat scanning machines.

2. The maintenance and control system of claim 1, wherein the control computer can transmit operational software to the threat scanning machine and command the threat scanning machine to reprogram with operational software and operate with operational software.

3. The maintenance and control system of claim 2, wherein the control computer can collect data from threat scanning machines and store said data.

4. The maintenance and control system of claim 3, wherein the control computer can display images from threat scanning machines.

5. The maintenance and control system of claim 4, wherein the control computer can transmit test images to threat scanning machines.

6. The maintenance and control system of claim 5, wherein the control computer can transmit threat profiles to the threat scanning machines.

7. The maintenance and control system of claim 6, wherein the control computer generates reports containing information about the performance of threat scanning machines.

8. The maintenance and control system of claim 7, wherein the control computer maintains a list of authorized users of the threat scanning machines and a list of the access credentials of the authorized users and the control computer transmits said list of authorized users and said list of access credentials to the threat scanning machines.

9. The maintenance and control system of claim 8, wherein the control computer is a portable computer.

10. The maintenance and control system of claim 9, wherein the communication network is a wireless network.

11. A method of centrally maintaining and controlling threat scanning machines located in an airport, the method comprising:
   connecting a control computer to a communication network;
   connecting a threat scanning machine to a communication network;
   loading the control computer with software to communicate with threat scanning machines;
   initiating communication between control computer and threat scanning machine;
   dynamically re-configuring the network by the control computer selecting a threat scanning machine in real time in response to a condition, and
   transmitting operational software from the control computer to the selected threat scanning machine.

12. The method of claim 11, further comprising the step of transmitting operational parameters from control computer to threat scanning machine.

13. The method of claim 12, further comprising the step of receiving data from threat scanning machines in the control computer.

14. The method of claim 13, further comprising the step of receiving images from the threat scanning machines in the control computer.

* * * * *